US007917236B1

(12) United States Patent
Yamada

(10) Patent No.: US 7,917,236 B1
(45) Date of Patent: Mar. 29, 2011

(54) VIRTUAL SOUND SOURCE DEVICE AND ACOUSTIC DEVICE COMPRISING THE SAME

(75) Inventor: Yuji Yamada, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/647,444

(22) PCT Filed: Jan. 27, 2000

(86) PCT No.: PCT/JP00/00421
§ 371 (c)(1),
(2), (4) Date: Aug. 8, 2003

(87) PCT Pub. No.: WO00/45619
PCT Pub. Date: Aug. 3, 2000

(30) Foreign Application Priority Data

Jan. 28, 1999 (JP) .................................... 11-020338

(51) Int. Cl.
*G06F 17/00* (2006.01)
*H04R 5/00* (2006.01)
*H04R 5/02* (2006.01)

(52) U.S. Cl. ............................ 700/94; 381/18; 381/310

(58) Field of Classification Search .................... 700/94; 381/17, 18, 63, 310, 61, 74, 309
See application file for complete search history.

(56) References Cited

U.S. PATENT DOCUMENTS 4,130,727 A * 12/1978 Kates ............................. 381/98
4,509,191 A * 4/1985 Miller ............................. 381/63
5,034,983 A * 7/1991 Cooper et al. ................ 381/310
5,371,799 A * 12/1994 Lowe et al. ................... 381/310
5,381,482 A * 1/1995 Matsumoto et al. ............ 381/18
5,572,591 A * 11/1996 Numazu et al. .................... 381/1
5,621,801 A * 4/1997 Kunimoto et al. .............. 381/63
5,854,843 A * 12/1998 Jacknin et al. ................ 381/309
5,991,085 A * 11/1999 Rallison et al. ............... 359/630
6,021,206 A * 2/2000 McGrath ....................... 381/310
6,084,556 A * 7/2000 Zwern ............................... 345/8
6,091,894 A * 7/2000 Fujita et al. ...................... 703/13
6,243,476 B1 * 6/2001 Gardner ........................ 381/303
6,718,042 B1 * 4/2004 McGrath ....................... 381/310

FOREIGN PATENT DOCUMENTS

JP 55-150700 A 11/1980
JP 01120999 A 5/1989
JP 4-149598 A 5/1992
(Continued)

*Primary Examiner* — Vivian Chin
*Assistant Examiner* — Daniel R Sellers
(74) *Attorney, Agent, or Firm* — Lerner, David, Littenberg, Krumholz & Mentlik, LLP

(57) ABSTRACT

A first signal processing section is used to constitute an impulse response of a head related transfer function region contributing to position recognition of a virtual sound source. A second signal processing section is used to realize an impulse response of a reflected sound region contributing to a sense of distance of the virtual sound source. A rotational angular speed sensor and a response characteristic control section are used to recognize position changes of the listener's ears. By controlling the first signal processing section, the sound image is localized with sufficient feeling of distance at an arbitrary position while suppressing signal processing operation quantity of the impulse response corresponding to the transfer function from the virtual sound source to both ears, and the position of the virtual sound source can be changed in correspondence with a change of position of the ears of the listener.

17 Claims, 14 Drawing Sheets

FOREIGN PATENT DOCUMENTS

| | | | |
|---|---|---|---|
| JP | 4-253097 | A | 9/1992 |
| JP | 7-095696 | A | 4/1995 |
| JP | 8-146974 | A | 6/1996 |
| JP | 9-090963 | A | 4/1997 |
| JP | 9-093700 | A | 4/1997 |
| JP | 10-136499 | A | 5/1998 |
| JP | 10-201000 | A | 7/1998 |

* cited by examiner

VIRTUAL SOUND SOURCE DEVICE AND ACOUSTIC DEVICE COMPRISING THE SAME

TECHNICAL FIELD

This invention relates to a virtual sound source device for generating virtual sound source and a sound apparatus and a sound equipment using such a virtual sound source device, and more particularly to a virtual sound source reproducing device comprising first signal processing means for carrying out signal processing in accordance with an impulse response portion which can perceive or sense position of virtual sound source of impulse responses of transfer functions of audio signals from the virtual sound source until to ears, second signal processing means for carrying out signal processing in accordance with impulse response portion which can perceive or sense only distance of the virtual sound source, and response characteristic control means for detecting change or movement of positions of both ears to control and correct response characteristic of the first signal processing means, and a sound apparatus and a sound equipment using such a virtual sound source device.

BACKGROUND ART

As the sound source followed by image of cinema, etc., audio signals of plural channels are used. Such audio signal channels of plural channels are recorded on the assumption that they are respectively delivered to speakers disposed at both sides and the center of screen onto which image is projected and speakers disposed at the rear side or both lateral sides of listener, etc. so that they are reproduced. As stated above, by reproducing audio signals of plural channels by three-dimensionally disposed speakers, sound position followed by image and position of sound image actually heard can be in correspondence with each other. Thus, sound field having natural spreading of sound can be established.

Meanwhile, when listener attempts to appreciate (listen) sound from sound source consisting of audio signals of plural channels by using headphone device of the head portion mounting type, sound image by audio signals to both ears is localized within the head. As a result, position of the sound source and localized position of sound image are not in correspondence with each other. Thus, there results extremely unnatural sound image localization. Further, in reproduction using headphone device, localization positions of sound images of respective sound sources cannot be separately and independently reproduced. Even in the case where audio signals of left and right two channels are reproduced, the headphone device is adapted so that sound image is localized within the head unlike reproduction by speaker. As a result, sound is heard from one portion within the head. Thus, localization position of sound image cannot be separated, and it is possible to only generate extremely unnatural sound field.

In order to eliminate such problems and to obtain sound image equivalent to the case where reproduction is carried out by speaker even in the case where listener listens to audio signals of plural channels by using headphone device, there are used headphone devices of the stereo out-of-head sound image localization type adapted to measure or calculate transfer functions or impulse responses from speakers provided so as to respectively reproduce audio signals of respective channels in advance until both ears of listener to convolute them onto audio signals from sound source by digital filter, etc. thereafter to listen to it by headphone device to thereby position (localize) sound image outside the head.

As the stereo out-of-head sound image localization type headphone device of this type, there is proposed headphone device constituted as shown in FIG. 1. This headphone device 8 localizes reproduction sound image by audio signal to the left ear and audio signal to the right ear at the outside of the head.

The operation of the stereo out-of-head sound image localization type headphone device 8 will now be described.

First, prior to the operation of the stereo out-of-head sound image localization type headphone device 8, the case where audio signals are heard by two speakers installed or provided at the positions spaced from listener will be described. Audio signals are transmitted to left ear YL and right ear YR of listener M from sound source SL of the left side through paths having transfer functions of HLL, HLR, respectively. In addition, audio signals are transmitted to the left ear YL and the right year YR of listener from sound source SR of the right side through paths having transfer functions of HRL, HRR, respectively.

In order to reproduce the state where audio signals from left and right sound sources are reproduced by using two speakers by using headphone attached on the head portion shown in FIG. 1, audio signal Sal from sound source SL of the left side is caused to be through filter for realizing transfer function HLL so that audio signal Sbll for left ear is obtained and audio signal Sal is caused to be through filter for realizing transfer function HLR so that audio signal for right ear is obtained. In addition, audio signal Sar of sound source SR of the right side is caused to be through filter for realizing transfer function HRL so that audio signal Sbrl for left ear is obtained and audio signal Sar is caused to be through filter for realizing transfer function HRR so that audio signal Sbrr for right ear is obtained.

Then, left ear synthetic audio signal Sbl=(Sbll+Sbrl) and right ear synthetic signal Sbr=(Sblr+Sbrr) are obtained. Such an approach is employed to drive left and right headphone elements 6*a*, 6*b* of headphone 6 by these left and right synthetic audio signals Sbll, Sblr. Thus, listener can perceive or sense sound image as if sound source is disposed at sound sources SL and SR.

In this case, a more practical configuration of stereo out-of-head sound image localization type headphone device 8 conventionally proposed will now be described with reference to FIG. 1. This headphone device 8 comprises a first input terminal 1L supplied with audio signal Sal, a second input terminal 1R supplied with audio signal Sar, a second input terminal 1R supplied with audio signal Sar, A/D converters 2L, 2R for respectively converting respective audio signals Sal, Sar into corresponding digital signals, signal processing circuits 3L, 3R for implementing filtering (processing) to the respective audio signals Sal, Sar converted into digital signals, adders 7L, 7R for adding outputs of respective two systems, D/A converters 4L, 4R for converting added outputs of 2 systems into analog signals, and amplifiers 5L, 5R for amplifying analog audio signals outputted from the respective D/A converters 4L, 4R to supply them to left and right headphone elements 6*a*, 6*b* of the headphone 6.

In this example, one signal processing circuit 3L is constituted by two digital filters 10, 11 as shown in FIG. 3, wherein one digital filter 10 carries out convolution of impulse response of transfer function HLL with respect to audio signal Sal inputted through an input terminal 12 to form a left ear audio signal Sbll to output it from an output terminal 13, and the other digital filter 11 carries out convolution of impulse response of transfer function HLR with respect to audio signal Sal inputted through the input terminal 12 to form a right ear audio signal Sblr to output it from an output terminal 14.

The other signal processing circuit 3R is similarly constituted by two digital filters 10,11 as shown in FIG. 3, wherein one digital filter 10 carries out convolution of impulse response for realizing transfer function HRL with respect to an audio signal Sar inputted through the input terminal 12 to form a left ear audio signal Sbrl to output it from the output terminal 13, and the other digital filter 11 carries out convolution of impulse response for realizing transfer function HRR with respect to an audio signal Sar inputted through the input terminal 12 to form a right ear audio signal Sbrr to output it from the output terminal 14.

The above-mentioned impulse response has characteristic as shown in FIG. 4. To realize this, the respective digital filters 10, 11 are constituted by FIR type digital filter 15 as shown in FIG. 5, for example. This FIR type digital filter 15 comprises, as shown in FIG. 5, plural delay elements 16 cascade-connected having a predetermined delay quantity, plural coefficient multipliers 17 for multiplying inputted audio signal and audio signals delayed by respective delay elements 16 by coefficients for carrying out convolution of impulse response, and plural adders 18 for adding audio signals outputted from the respective coefficient multipliers 17.

For example, delay element 16 of the first stage of the digital filter 10 (11) in the signal processing circuit 3L delays, e.g., by one sampling period, audio signal Sal (or Sar) inputted through the input terminal 12, and delay element 16 of the i (i=2, 3, . . . )-th stage delays, similarly by one sampling period, delayed audio signal outputted from the preceding stage (i−1-th stage) to deliver it to delay element 16 of the succeeding stage (i+1-th stage). The coefficient multipliers 17 of respective stages respectively multiply input audio signal Sal and audio signals delayed in sequence at delay elements 16 of respective stages by coefficients for carrying out convolution of impulse response to deliver them to adders 18 of corresponding stages. The adders 18 of respective stages add, to outputs of adders 18 of preceding stages, outputs of coefficient multipliers 17 of corresponding stages to deliver them to adders 18 of succeeding stages. Namely, the adder 18 of the final stage carries out convolution of impulse response of transfer function HLL (HLR) with respect to audio signal Sal (Sar) inputted through the input terminal 12 to form left ear audio signal Sbll (right ear audio signal Sblr) to output it through the output terminal 13 (14).

Similarly, the adder 18 of the final stage of the digital filter 10 (11) in the signal processing circuit 3R carries out convolution of impulse response of transfer function HRL (HRR) with respect to audio signal Sal (Sar) inputted through the input terminal 12 to form left ear audio signal Sbrl (right ear audio signal Sbrr) to output it through the output terminal 13 (14).

In the case where the previously described two digital filters 10, 11 shown in FIG. 3 are realized by FIR type digital filter, they are collectively represented as shown in FIG. 6. The FIR type digital filter 20 shown in FIG. 6 is constituted as a single filter block by sharing cascade-connected plural delay elements 16 in obtaining outputs of two systems by using two FIR type digital filters 15 shown in FIG. 5. As stated above, as compared to the fact that two FIR type digital filters 15 as shown in FIG. 5 are prepared, FIR type digital filter 20 is constituted as shown in FIG. 6. Thus, the number of delay elements is reduced to one half so that the circuit scale becomes compact and signal processing operation quantity is reduced.

The above-described left ear audio signals Sbll, Sbrl outputted from signal processing circuits 3L, 3R of the headphone device 8 shown in FIG. 1 are added by one adder 7L so that left ear synthetic audio signal Sbl is obtained, and the above-described right ear audio signals Sblr, Sbrr outputted from signal processing circuits 3L, 3R are added by one adder 7L so that right ear synthetic audio signal Sbr is obtained. The left ear synthetic audio signal Sbl and the right ear synthetic audio signal Sbr obtained in this way are respectively converted into analog signals at D/A converters 4L, 4R. The left ear synthetic audio signal Sbl and the right ear synthetic audio signal Sbr converted into analog signals are respectively amplified by amplifiers 5L, 5R. The signals thus amplified are respectively delivered to left and right headphone elements ba, 6*b* of the headphone 6 so that they are reproduced. As the result of the fact that the left ear synthetic audio signal Sbl and the right ear synthetic audio signal Sbr are reproduced in this way, listener M who has attached the headphone 6 perceives (senses) as if left and right two sound sources SL, SR are actually exist as shown in FIG. 2, thus making it possible to respectively localize reproduction sound images by the left ear synthetic audio signal Sbl and the right ear synthetic audio signal Sbr at the outside of the head.

On the other hand, in reproduction of audio signals using speaker, there are also instances where arrangement of speakers within the room is restricted. As a result, there are cases where it is difficult to dispose a large number of speakers within listening room. In view of the above, there has been proposed an example where a lesser number of speakers, eg., two speakers are used to constitute a large number of reproduction sound sources around listener as virtual sound source.

The example where these two speakers are used to constitute a large number of virtual speaker sound sources will be described with reference to FIGS. 7 and 8.

First, the principle of speaker unit 30 shown in FIG. 7 will be described with reference to FIG. 8.

In order to virtually reproduce sound source SO by using sound source SL and sound source SR, when it is assumed that transfer functions of audio signals from the sound source SL up to left ear YL and right ear TR of listener M are respectively HLL, HLR, transfer functions of audio signals from the sound source SR up to left ear YL, right ear YL of listener M are respectively HRL, HRR, and transfer functions of audio signals from sound source SO up to left ear YL, right ear YR of listener M are respectively HOL, HOR, the transfer (transmission) relationship between the sound source SL and the sound source SO is represented by the formula (1) described below and the transfer relationship between the sound source SR and the sound source SD is represented by the formula (2) described below.

$$SL=\{(HOL\times HRR-HOR\times HRL)/(HLL\times HRR-HLR\times HRL)\}\times SO \quad (1)$$

$$SR=\{(HOR\times HLL-HOL\times HLR)/(HLL\times HRR-HLR\times HRL)\}\times SO \quad (2)$$

Accordingly, such an approach is employed to allow audio signal Sao of sound source SO to be through filter which realizes transfer function portion of the formula (1) to thereby obtain left ear synthetic audio signal Sbl, and to allow the audio signal Sao to be through filter which realizes transfer function portion of the formula (2) to thereby obtain right ear synthetic audio signal Sbr to drive two speakers disposed at positions of sound sources SL, SR by these left ear and right ear synthetic audio signals Sbl, Sbr, thereby making it possible to localize virtual sound source as if audio signal Sao is generated from the position of sound source SO.

Speaker unit 30 for reproducing virtual sound source SO as described above can localize sound image of input signal inputted from two speakers to both ears at an ordinary position as shown in FIG. 7. This speaker unit 30 comprises an input terminal 21 supplied with audio signal Sao, an A/D converter 22 for converting the audio signal Sao into digital signal, and a signal processing section (unit) 23 for implementing filtering (processing) to the audio signal Sao converted into digital signal. The signal processing unit 23 is constituted by the previously described two digital filters 10, 11 as shown in FIG. 3, wherein one digital filter 10 convolutes impulse response corresponding to transfer function portion of the above-described formula (1) with respect to audio signal Sao to form left ear synthetic audio signal Sbl, and the other digital filter 11 convolutes impulse response corresponding to transfer function portion of the above-described formula (2) with respect to audio signal Sao to form right ear synthetic audio signal Sbr. With respect to digital filters 10, 11 for realizing transfer function, e.g., the previously described FIR type digital filter 15 shown in FIG. 5 or the previously described FIR type digital filter 20 shown in FIG. 6 is used, thereby making it possible to reduce the circuit scale.

The left ear and right ear synthetic audio signals Sbl, Sbr are respectively converted into analog signals by D/A converters 24L, 24R, and the left and right ear synthetic audio signals Sbl, Sbr of analog signal are respectively amplified by amplifiers 25L, 25R and are delivered to a left speaker 26L and a right speaker 26R. The left and right speakers 26L, 26R are respectively disposed at positions of sound sources SL, SR with respect to listener M.

As stated above, reproduction sound image by audio signal Sao can be localized at position of virtual sound source SO. Further, with respect to a larger number of sound sources, it is sufficient to carry out the above-described processing by the number of sound sources. Since a larger number of virtual speaker sound sources can be constituted from a lesser number of speaker sound sources by this method, the number of speakers can be reduced.

In the above-described headphone device and speaker unit, it is necessary for obtaining sufficient distance feeling with respect to virtual sound source to reproduce impulse response from respective sound sources to both ears obtained by measurement within reverberation room. Since such impulse response is vast digital quantity having long reverberation time, there is the problem that in the case where such a system is constituted by digital filter, its operation (computing) quantity and the scale become extremely large.

Further, in the above-described stereo out-of-head sound image localization type headphone device, in the case where positions of both ears of listener are changed during listening of virtual sound source, transfer function from electro-acoustic transducer (headphone element) which is reproduction sound source to both ears is not changed. Accordingly, sound is heard always from the same direction with respect to both ears irrespective of movement of both ears of listener. Thus, listener suffers from unnatural feeling such that directions in which sounds are heard are the same although he moves the head.

In addition, in the speaker unit, since transfer function from acoustic transducer (speaker) which is reproduction sound source to both ears is changed by change of positions of both ears of listener, primary position of virtual sound source is localized at unsuitable position. This always gives feeling of disagreement to listener.

DISCLOSURE OF THE INVENTION

This invention has been proposed in view of circumstances described above, and its object is to provide a virtual sound source reproducing device, and a sound apparatus and a sound equipment using such a device, wherein, in a sound apparatus such as headphone unit or speaker unit, etc. and a sound equipment used in combination therewith, it is possible to localize sound image with sufficient feeling of distance at an arbitrary position while suppressing operation quantity of impulse response of the previously described transfer function so that position of virtual sound source is changed in correspondence with changes of positions of both ears of listener.

This invention proposed for the purpose of attaining such objected relates to a virtual sound source reproducing device for reproducing virtual sound source, wherein such an approach is employed to carry out signal processing in accordance with transfer function or impulse response until respective audio signals Sa generated from one sound source or more, e.g., speaker disposed within space reaches both ears so that there result respective audio signals Sb to generate respective audio signals Sb to synthesize these audio signals Sb to generate two kinds of synthetic audio signals for both ears to input these two kinds of synthetic audio signals to the both ears to perceive (sense) as if one sound source or more are disposed within space.

The virtual sound source reproducing device according to this invention comprises first signal processing means for forming portions of impulse response contributing to perception (sense) of respective positions of one virtual sound source or more of impulse responses corresponding to respective transfer functions of respective audio signals Sa produced from one sound source or more to carry out signal processing of respective audio signals Sa in accordance with the respective portions of impulse response thus formed to obtain a pair of initial response signals, and to delay inputted audio signal by time corresponding to time length of each impulse response portion to obtain delayed output signals, second signal processing means for carrying out signal processing of the delayed output signals in accordance with impulse response portion contributing to perception (sense) of only distance of one virtual sound source or more of impulse responses corresponding to respective transfer functions to obtain a pair of reflected response signal, and synthesizing means for adding the pair of initial response signals and the pair of reflection response signals with respect to respective both ears to form outputs to the both ears.

Further, the virtual sound source reproducing device according to this invention may comprise virtual sound source transfer characteristic correcting means for correcting transfer characteristic of the first signal processing means, wherein changes of positions of both ears also correspond to virtual sound source, the correcting means being operative in order to perceive (sense) as if positions of both ears are changed with respect to one sound source or more disposed within space.

Furthermore, the virtual sound source reproducing device, and sound apparatus and sound equipment using such a device according to this invention has a configuration described below.

Namely, the first signal processing means is of configuration in which there are provided FLR type digital filters every transfer functions corresponding to respective audio signals Sa in which plural delay elements having a predetermined delay quantity are cascade-connected to synthesize respective outputs of junctions of respective delay elements after undergone weighting, wherein FIR type digital filter corresponding to transfer function HL until one audio signal Sal is transferred (transmitted) to the left ear and FIR type digital filter corresponding to transfer function HR until one audio signal Sal is transferred (transmitted) to the right ear are provided with cascade-connected delay elements being as common element. In this first signal processing means, with respect to one audio signal Sal, there are obtained audio signal Sald in which this audio signal Sal is delayed, audio signal Sbll caused to undergo signal processing in accordance with transfer function HL and audio signal Sblr caused to undergo signal processing by transfer function HR. With respect to plural audio signals, there are obtained delayed synthetic audio signal obtained by synthesizing audio signals Sald with each other with respect to respective audio signals Sa, initial response signal for left ear obtained by synthesizing audio signals Sbll with each other with respect to respective audio signals Sa, and initial response signal for right ear obtained by synthesizing audio signals Sblr with each other with respect to respective audio signals Sa.

The second signal processing means is FIR type digital filter in which plural delay elements having a predetermined delay quantity are cascade-connected and respective outputs of junctions of respective delay elements are synthesized after undergone weighting, wherein, in the FIR type digital filter, FIR type digital filter supplied with delayed synthetic audio signal from the first signal processing means, and corresponding to transfer function for right ear and FIR type digital filter supplied with delayed synthetic audio signal and corresponding to transfer function for left ear are constituted with the cascade-connected delay elements being common element, thus to output reflected response signal for left ear and reflected response signal for right ear.

The virtual sound source transfer characteristic correcting means is composed of displacement speed detecting means in which, positions of both ears from which virtual sound source reproduced with positions of both ears with respect to position of one sound source or more disposed in space being as reference is caused to be initial state, thus to detect displacement speeds of both ears from the positions of the both ears in the initial state, displacement quantity calculating means for calculating position change quantities of the both ears from the initial state on the basis of output of the displacement speed detecting means, and response characteristic control means for correcting response characteristic of the first signal processing means with respect to respective audio signals Sa by output of the displacement quantity calculating means.

This response characteristic control means directly controls parameters constituting the first signal processing means to correct change of response characteristic.

Further, the response characteristic control means controls time difference adding sections and level difference adding sections separately provided for both ears in order to constitute the first signal processing means to correct change of response characteristic.

In the virtual sound source reproducing device according to this invention having configuration as described above carries out signal processing of respective audio signals in accordance with impulse response portion contributing to perception (sensing) of positions of the respective sound sources of impulse responses corresponding to transfer functions of respective audio signals from the respective sound sources to both ears to independently synthesize such audio signals for both ears to obtain a pair of reflected response signals and delayed output signals, and carries out signal processing of the delayed output signals in accordance with the portion of impulse response contributing to perception (sensing) of only distances of respective sound sources by the second signal processing means to obtain a pair of reflected response signals corresponding to respective both ears to add, with respect to respective both ears, a pair of initial response signals and a pair of reflected response signals by synthesizing means to deliver such signals to the both ears by acoustic transducer (conversion) element such as headphone element, etc., thereby making it possible to reproduce virtual sound sources with respect to respective sound sources with sufficient feeling of distance and feeling of direction. Further, there is employed such a configuration to carry out signal processing in accordance with the portion of impulse response contributing to perception (sensing) of only distances of the respective sound sources collectively with respect to respective audio signals by the second processing means, thereby making it possible to reduce the scale of the signal processing means.

In addition, positions of both ears in which virtual sound source reproduced with positions of both ears with respect to one sound source or more disposed within space being as reference are caused to be initial state, wherein such an approach is employed to detect, by displacement speed detecting means, displacement speed of both ears from the positions of the both ears placed in this initial state, and to calculate, by displacement quantity calculating means, position change (displacement) quantity of both ears from the initial state to correct change of response characteristic. Thus, it becomes possible to eliminate the state where sounds are heard from the same direction at all times with respect to both ears although both ears are moved with respect to the virtual sound source, and/or unnatural listening of reproduction sound that listener feels such that when both ears are moved, sound image is localized at unsuitable position entirely different from the primary position of virtual sound source.

Still further objects of this invention and more practical merits obtained by this invention will become more apparent from the explanation of the embodiment which will be given.

BEST MODE FOR CARRYING OUT THE INVENTION

More practical examples of a virtual sound source reproducing device and a sound apparatus and a sound equipment comprising such a device will now be described with reference to the attached drawings.

Figure 9:
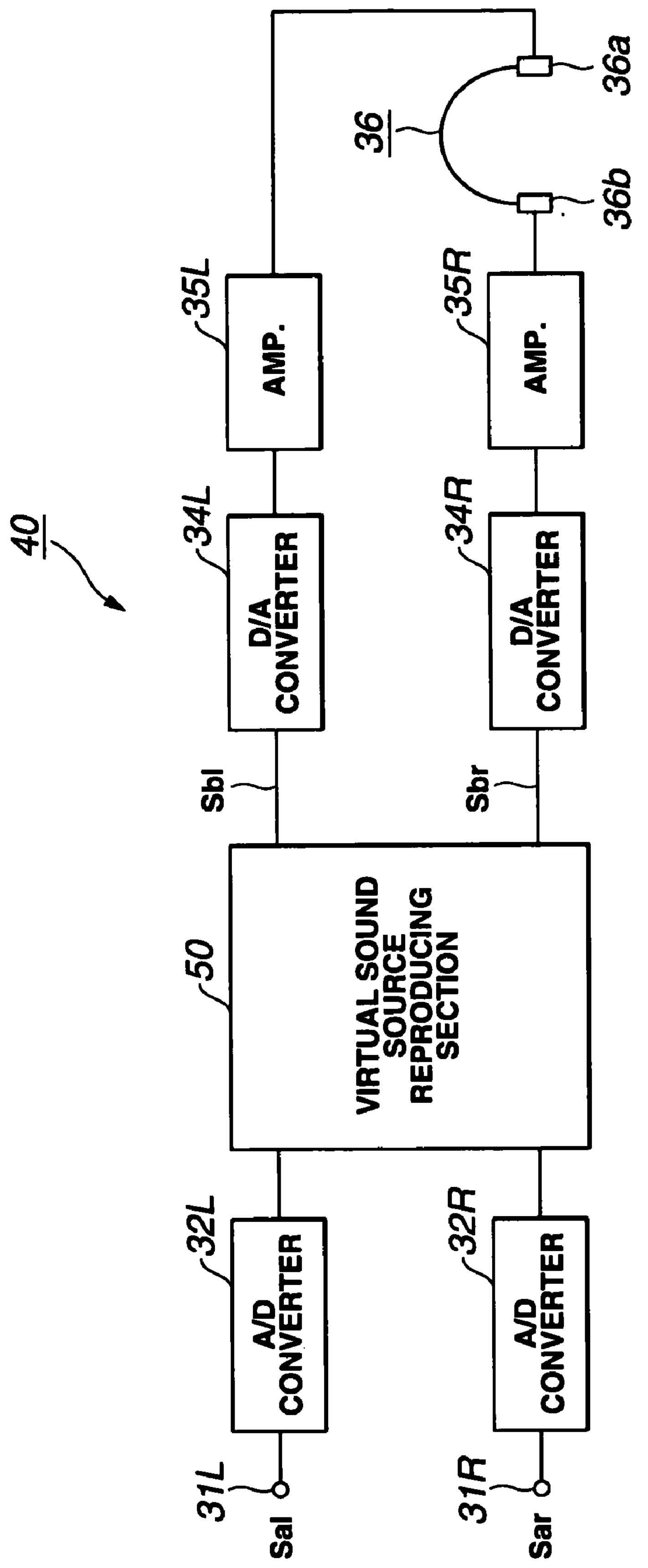
FIG. 9 is a block diagram showing the example where virtual sound source reproducing device according to this invention is applied to headphone device.

First, the example where this invention is applied to a headphone device (unit) 40 comprising virtual sound source reproducing device will be described. This headphone unit 40 comprises, as shown in FIG. 9, a first input terminal 31L supplied with audio signal Sal, a second input terminal 31R supplied with audio signal Sar, A/D converters 32L, 32R for respectively converting respective audio signals Sal, Sar into digital signals, a virtual sound source reproducing section (unit) 50 for implementing a predetermined digital signal processing to the respective audio signals Sal, Sar converted into digital signals to output such digital signals in the state divided into two systems of synthetic audio signals Sbl, Sbr for left and right ears as stereo signal, D/A converters 34L, 34R for converting respective audio signals Sbl, Sbr outputted from this virtual sound source reproducing section 50 into analog signals, and amplifiers 35L, 35R for amplifying analog audio signals outputted from respective D/A converters 34L, 34R to deliver them to left and right headphone elements 36*a*, 36*b* of a headphone 36.

In this headphone unit 40, there is employed such an approach to convert, by two A/D converters 32L, 32R, respective audio signals Sal, Sar from virtual sound sources respectively inputted from the first and second input terminals 31L, 31R into digital signals to implement digital signal processing, by the virtual sound source reproducing section 50, to the respective audio signals Sal, Sar converted into digital signals to output such digital signals in the state divided into two systems of synthetic audio signals Sbl, Sbr for left and right ears to convert these synthetic audio signals Sbl, Sbr into analog signals by D/A converters 34 L, 34R to amplify such analog signals by amplifiers 35L, 35R to deliver them to left and right headphone elements 36*a*, 36*b* of the headphone 36 to reproduce them. Thus, it is possible to localize sound image of virtual sound source at a predetermined position outside the head of listener who has attached headphone 36.

It is to be noted that the virtual sound source reproducing section 50 used here may be provided within sound unit such as headphone 36, etc., or may be provided within another sound equipment.

Figure 10:
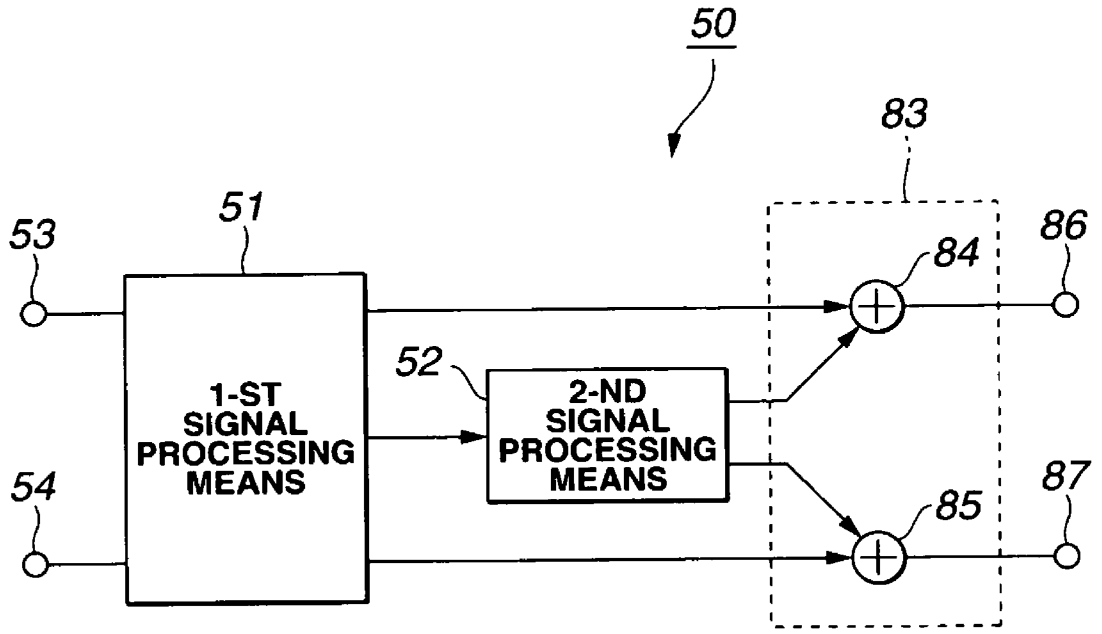
FIG. 10 is a block diagram showing outline of the configuration of the virtual sound source reproducing device according to this invention.

The virtual sound source reproducing section 50 according to this invention used in the above-described headphone unit 40 is composed, as shown in FIG. 10, of first signal processing means 51 such that when sounds corresponding to synthetic audio signals Sbl, Sbr for left and right ears are heard by the headphone 36, it implements digital signal processing such that head outside sound image localization of virtual sound source is obtained with respect to a predetermined direction, and second signal processing means 52 for carrying out such a processing to perceive (sense) distance of sound image localization.

Figure 11:
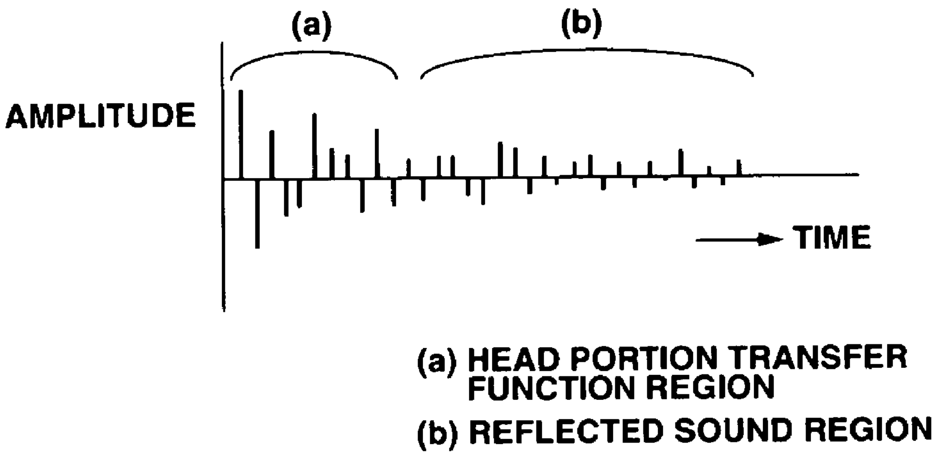
FIG. 11 is an explanatory view for explaining impulse response of transfer function of audio signal from sound source up to both ears.

Here, an example of impulse response corresponding to transfer function from sound source to be reproduced by the virtual sound source reproducing section 50 up to both ears is shown. Waveform corresponding to this impulse response consists, as shown in FIG. 11, of impulse response portion (a) contributing to perception (sense) of position of sound source, and impulse response portion (b) contributing to perception (sense) of only distance up to sound source, wherein (a) is impulse response portion mainly indicating head related transfer function and is called head related transfer function region, and (b) is mainly impulse response portion mainly indicating reflected sound and is called reflected sound region. In this example, the impulse response portion (a) is about 10 to 30 ms.

Figure 12:
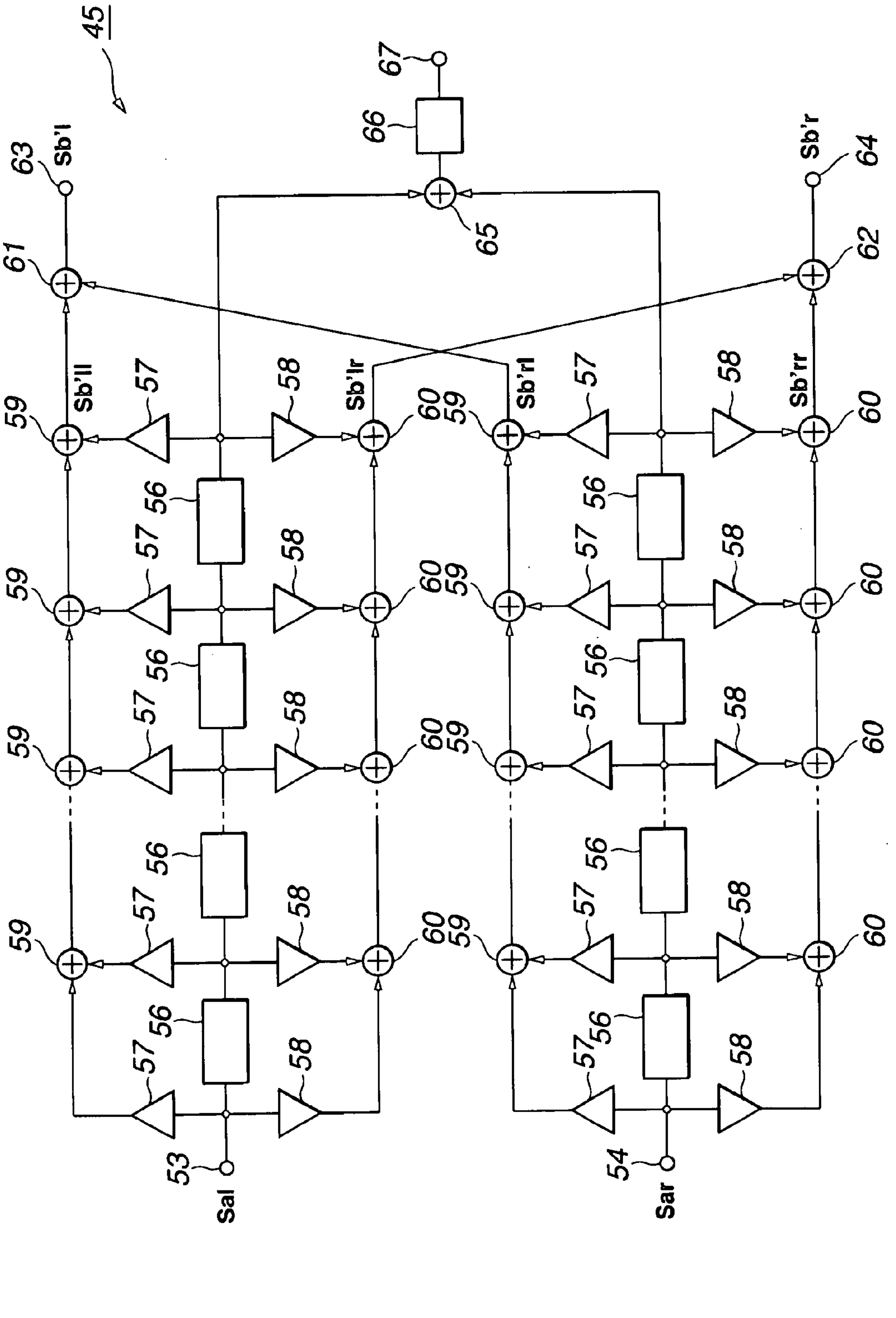
FIG. 12 is a block diagram of first signal processing means constituting the virtual sound source reproducing device according to this invention.

The first signal processing means 51 constituting the virtual sound source reproducing section 50 is constituted by, e.g., FIR type digital filter 45 as shown in FIG. 12. This digital filter 45 is of configuration in which there are combined two FIR type digital filters adapted to output input signal Sal inputted through a first input terminal 53 as output signals of two systems and to output input signal Sar inputted through a second input terminal 54 as output signals of two systems, and respective digital filters are constituted as one filter block with cascade-connected plural delay elements 56 being as common element.

The respective digital filters constituting FIR type digital filter 45 shown in FIG. 12 comprise cascade-connected plural delay elements 56 having a predetermined delay quantity, respective plural coefficient multipliers 57, 58 for multiplying inputted audio signal and audio signals delayed at respective delay elements 57 by coefficients for carrying out convolution of impulse response, and respective plural adders 59, 60 for adding audio signals outputted from the respective coefficient multipliers 57, 58.

For example, delay element 56 of the 1-st stage of digital filter supplied with audio signal Sal delays, by predetermined delay quantity, e.g., one sampling period audio signal Sal inputted through the input terminal 53, and delay element 56 of the i (i=2, 3, . . . )-th stage delays, similarly by one sampling period, delayed audio signal outputted from the delay element 56 of the preceding stage (i−1-th stage) to deliver it to delay element 56 of succeeding stage (i+1-th stage). The respective stages of coefficient multipliers 57 (58) multiply input audio signal Sal and audio signals delayed in sequence at the respective stages of delay elements 56 by coefficients for carrying out convolution of impulse response to deliver them to adders 59 (60) of corresponding stages. The adders 59 (60) of respective stages add outputs of coefficient multipliers 57 (58) of corresponding stages to outputs of adders 59 (60) of the preceding stages to deliver them to adders 59 (60) of succeeding stages. Namely, the adder 59 (60) of the final stage carries out convolution of impulse response of transfer function HLL (HLR) with respect to audio signal Sal inputted through the input terminal 53 to form response signal Sb ll (Sb'lr) to deliver it to adder 61 (62).

Similarly, adder of the final stage of digital filter supplied with audio signal Sar carries out convolution of impulse response of transfer function HRL (HRR) with respect to audio signal Sar inputted through the input terminal 54 to form response signal Sb'rl (Sb'rr) to deliver it to adder 61 (62).

Namely, since this FIR type digital filter 45 constitutes filters of four systems by combining two digital filters to output signals of two systems, delay element 56 cascade-connected can be shared by filters of two systems and the number of delay elements 56 used can be reduced to one half.

Impulse response of the FIR type digital filter 45 shown in FIG. 12 forms head related transfer function region corresponding to one portion of respective impulse responses corresponding to the previously described transfer functions HLL, HLR, HRL, HRR of four systems which has been explained with reference to FIG. 2, i.e., impulse response portion (a) mainly representing head related transfer function from the first (initial) response as shown in FIG. 11. In this region, impulse responses (a) different from each other are convoluted at four systems of FIR type digital filter 45. By this calculation, signal processing of input signal is carried out in accordance with impulse response from virtual sound source up to both ends of listener to reproduce it. Thus, there can be obtained response signal contributing to perception (sensing) of position of virtual sound source for localizing reproduction sound image at position of virtual sound source.

Outputs of four systems of the FIR type digital filter 45 shown in FIG. 12 are respectively synthesized by adders 61, 62, and are respectively outputted from first and second output terminals 63, 64 as initial response signals Sb'l, Sb'r for left and right ears. Moreover, input signals Sal, Sar delayed by predetermined times by cascade-connected delay elements 56, 56 constituting respective digital filters are synthesized by an adder 65. Thereafter, the input signals thus obtained is delayed by a delay element 66 and is outputted from an output terminal 67 as synthetic delayed output signal. In this example, the delay element 66 additionally connected to the output terminal 67 serves to provide delay for timing correction when there are synthesized initial response signal from the first signal processing means 51 constituted by the FIR type digital filter 45 shown in FIG. 12 and reflected response signal from the second signal processing means 52 which will be described later. In the case where rigorous timing correction is unnecessary, such delay element may be omitted, and this delay element 66 may be additionally connected to input terminal 68 of the second signal processing means 52.

Figure 13:
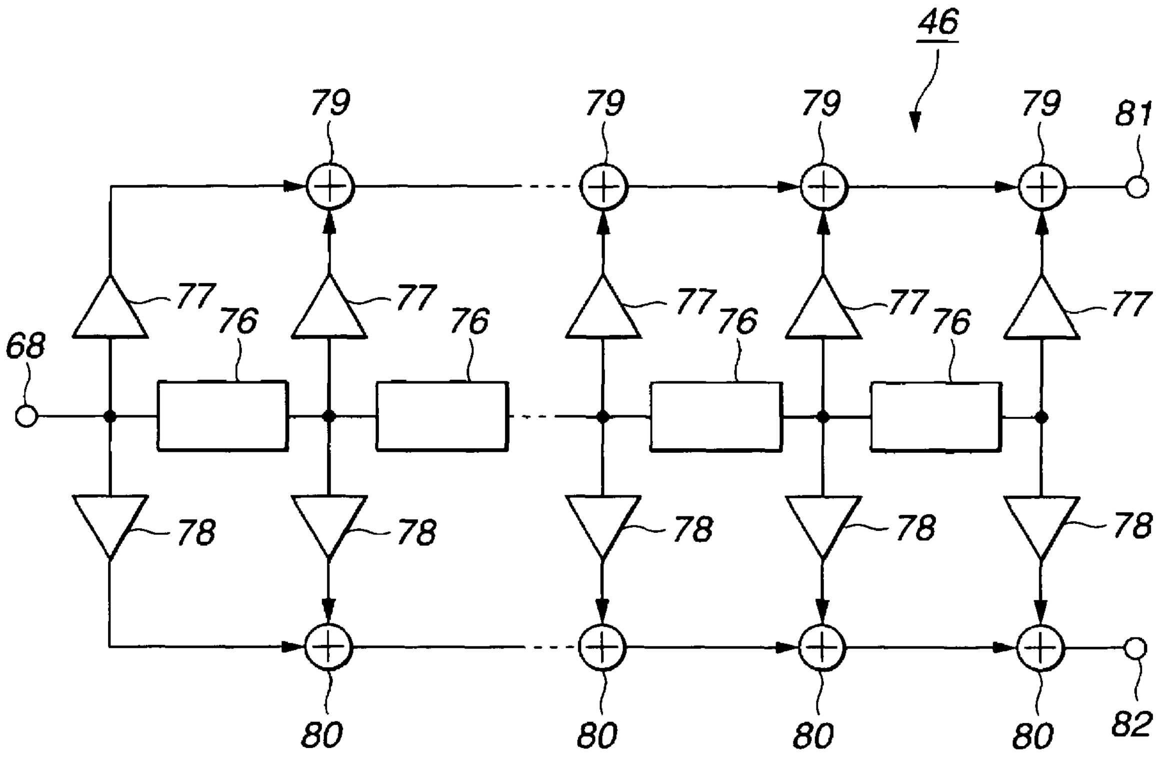
FIG. 13 is a block diagram of second signal processing means constituting the virtual sound source reproducing device according to this invention

Further, synthetic delay signal outputted from the output terminal 67 of the FIR type digital filter 45 shown in FIG. 12 corresponds to synthetic delay output signal obtained by synthesizing delay output signals outputted from head related transfer function processing means supplied with plural audio signals, and is inputted to the input terminal 68 of the second signal processing means 52 constituted by FIR type digital filter 46 shown in FIG. 13.

FIR type digital filter 46 constituting second signal processing means 52 shown in FIG. 13 is caused to be of configuration to output input signal inputted through the input terminal 68 as output signals of 2 systems, and is caused to be of configuration as single filter block with cascade-connected plural delay elements 76 being as common elements. In more practical sense, this FIR type digital filter 46 is composed of cascade-connected plural delay elements 76 having a predetermined delay quantity, respective plural coefficient multipliers 77, 78 for multiplying input signal and signals delayed by the respective delay elements 76 by coefficients for carrying out convolution of impulse response, and respective plural adders 79, 80 for adding signals outputted from the respective coefficient multipliers 77, 78.

The delay element 76 of the first stage delays signal inputted through the input terminal 68 by predetermined delay quantity, e.g., one sampling period, and the delay element 76 of the i (i=2, 3, . . . )-th stage delays, similarly one sampling period, delayed signal outputted from the delay element 76 of the preceding stage (i−1-th stage) to deliver it to the delay element 76 of the succeeding stage (i+1-th stage). The coefficient multipliers 77 (78) of respective stages respectively multiply input signal and signals delayed in sequence at delay elements 76 of respective stages by coefficients for carrying out convolution of impulse response to deliver them to adders 79 (80) of corresponding stages. The adders 79 (80) of respective stages add, to outputs of adders 79 (80) of the preceding stages, outputs of coefficient multipliers 77 (78) of corresponding stages to deliver them to the adders 79 (80) of the succeeding stages. Namely, adder 79 (80) of the final stage carries out convolution of impulse response indicating initial response sound with respect to signal inputted through input terminal 53 to form reflected sound to output this reflected sound through output terminal 81 (82).

In the FIR type digital filter 46 shown in FIG. 13 constituting the second signal processing means 52, portions of different impulse responses of either two systems of impulse responses corresponding to the above-described transfer functions HLL, HLR, HRL, HRR of four systems are convoluted, and are outputted from first and second output terminals 81, 82. Respective outputs outputted from these output terminals 81, 82 serve to form (b) reflected sound region which is impulse response portion mainly indicating the previously described reflected sound, and correspond to impulse response portion contributing to perception (sensing) of only distance from virtual sound source up to both ears of listener.

In the case where virtual sound images to be reproduced are disposed substantially at the same distance from listener, impulse response portions of respective reflected sound regions are similar to each other in either system. For this reason, as stated above, such an approach may be employed to use impulse response portion of reflected sound regions of any two systems as coefficients of FIR type digital filter, to synthesize impulse response portions of reflected sound regions of any two systems, and to determine impulse response portion of reflected sound region of impulse responses corresponding to transfer functions from virtual sound source position except for the above, e.g., the front center.

Output Sb'l from the first output terminal 63 and output Sb'r from the second terminal 64 of FIR type digital filter 45 shown in FIG. 12 constituting the first signal processing means 51 correspond to a pair of initial response signals contributing to position of the virtual sound source, and output signals respectively outputted from first output terminal 81 and second output terminal 82 of FIR type digital filter 46 shown in FIG. 13 constituting second signal processing means 52 correspond to a pair of reflected response signal contributing to perception (sensing) of only distance from virtual sound source up to both ears of listener.

A pair of initial response signals outputted from first signal processing means 51 and a pair of reflected response signals outputted from the second signal processing means 52 are added at respective adders 84, 85 constituting operation (computing) means 83 every signals corresponding to left and right signals in the case where stereo reproduction is carried out, and are respectively outputted from the first and second output terminals 86, 87 as left ear synthetic audio signal Sbl and right ear synthetic audio signal Sbr. The left ear synthetic signal Sbl and the right ear synthetic signal Sbr respectively outputted from these output terminals 86, 87 are returned (converted) into analog signals for a second time by D/A converters 34L, 34R of two systems shown in FIG. 9 to deliver them to left and right headphone elements 36*a*, 36*b* of headphone 6 through amplifiers 35L, 35R to reproduce them, thereby making it possible to allow listener to listen to reproduction sound having optimum (suitable) out-of-head sound image localization.

A second embodiment of the virtual sound source reproducing unit according to this invention will be described with reference to FIG. 14.

This virtual sound source reproducing unit 150 serves to obtain left ear synthetic audio signal Sbl and right ear synthetic audio signal Sbr respectively inputted from one sound source to both ears, and is adapted, for the purpose of localizing one sound source at arbitrary position, to realize, by digital filter, convolution of impulse response of two transfer functions from virtual sound source up to both ears.

Figure 14:
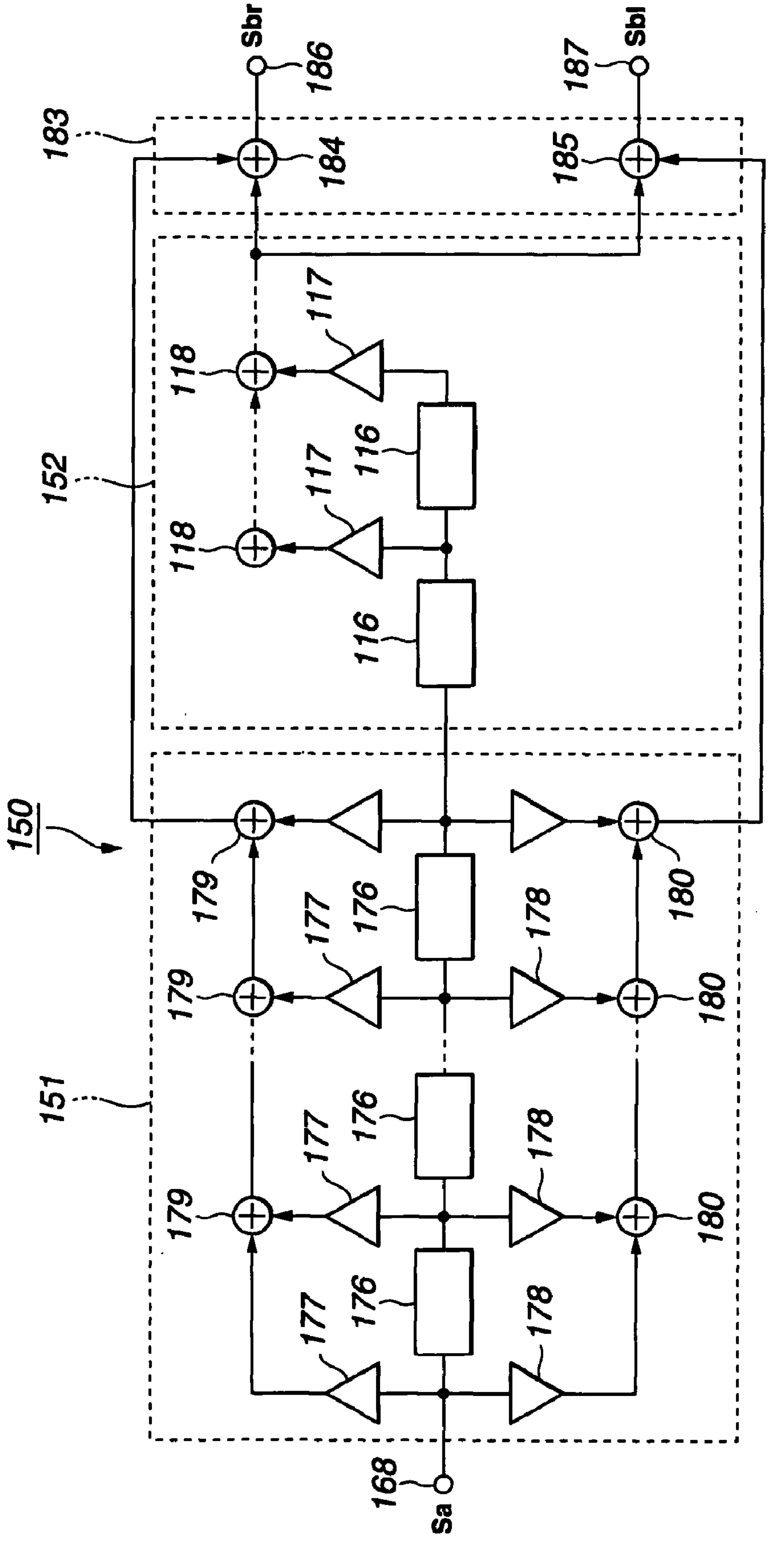
FIG. 14 is a block diagram of virtual sound source reproducing device according to this invention in the case where virtual sound source having one sound source is reproduced.

In the virtual sound source unit 150 shown in FIG. 14, as initial response of the impulse response, i.e., impulse response of the head related transfer function region is formed from head related transfer function of transfer function HL from the virtual sound source to the left ear and transfer function HR from the virtual sound source to the right ear, respective coefficients are assigned to two FIR type digital filters to independently convolute them. This portion corresponds to first signal processing means 51 of the previously described virtual sound source unit 50 shown in FIG. 10 of the first embodiment.

First signal processing means 151 of this virtual sound source unit 150 is FIR type digital filter constituted in order to output, as output signals of 2 systems, input signal Sa inputted through an input terminal 168, and is constituted as one filter block with cascade-connected plural delay elements being commonly used. In more practical sense, this FIR type digital filter is composed of cascade-connected plural delay elements 176 having a predetermined delay quantity, respective plural coefficient multipliers 177, 178 for multiplying input signal and signals delayed by the respective delay elements 176 by coefficients for carrying out convolution of impulse response, and respective plural adders 179, 180 for adding signals outputted from the respective coefficient multipliers 177, 178.

The delay element 176 of the first stage delays, by predetermined delay quantity, e.g., one sampling period, signal Sa inputted through the input terminal 168, and delay element of the i (i=2, 3, . . . )-th stage delays, similarly by one sampling period, delayed signal outputted from delay element 176 of preceding stage (i−1-th stage) to deliver it to delay element 176 of the succeeding stage (i+1-th stage). Coefficient multipliers 177 (178) of respective stages respectively multiply input signal and signals delayed in sequence at delay elements 176 of respective stages by coefficients for carrying out convolution of impulse response to deliver them to adders 179 (180) of corresponding stages. The adders 179 (180) of the respective stages add, to outputs of adders 179 (180) of the preceding stages, outputs of coefficient multipliers 177 (178) of corresponding stages to deliver them to the adders 179 (180) of the succeeding stages. Namely, the adder 179 (180) of the final stage carries out convolution of impulse response indicating initial response sound with respect to signal inputted through input terminal 168 to form reflected sound to add reflected sounds at respective adders 184, 185 constituting calculating means 183 every signals corresponding to left and right signals in the case of carrying out stereo reproduction to output them from first and second output terminals 186, 187 as left ear synthetic audio signal Sbl and right synthetic audio signal Sbr.

In the impulse response of the latter portion, i.e., impulse response of the reflected sound region, output signals delayed by delay elements 176 of FIR type digital filter constituting the above-described first signal processing means 151 are convoluted by coefficients common to impulse responses of respective reflected sound regions. Thus, the number of coefficients can be reduced, i.e., the number of multipliers can be reduced. Scale of signal processing can be reduced. This portion corresponds to second signal processing means 52 of the previously described virtual sound source unit 50 in the first embodiment.

In this case, the second signal processing means 152 is composed of cascade-connected plural delay elements 116 having a predetermined delay quantity, plural coefficient multipliers 117 for multiplying output signal from the first signal processing means 151 inputted and signals delayed at respective delay elements 116 by coefficients for carrying out convolution of impulse response, and plural adders 118 for adding signals outputted from the respective coefficient multipliers 117.

The output signals processed by the second signal processing means 152 are respectively added to left ear synthetic audio signal Sbl and right ear synthetic audio signal Sbr, and are outputted from first and second output terminals 186, 187 in the state where they are synthesized with left ear synthetic audio signal Sbl and right ear synthetic audio signal Sbr.

Since impulse response portions of respective reflected sound regions are similar response in either system as described above, impulse response portion of reflected sound region of any system may be used as coefficients of FIR type digital filter, impulse response portions of reflected sound regions of plural systems may be synthesized, and impulse response portion of reflected sound region of impulse response corresponding to transfer function from virtual sound source position except for the above, e.g., front and center may be determined to use it.

A third embodiment of the virtual sound source reproducing device (unit) according to this invention will now be described with reference to FIG. 15.

Figure 15:
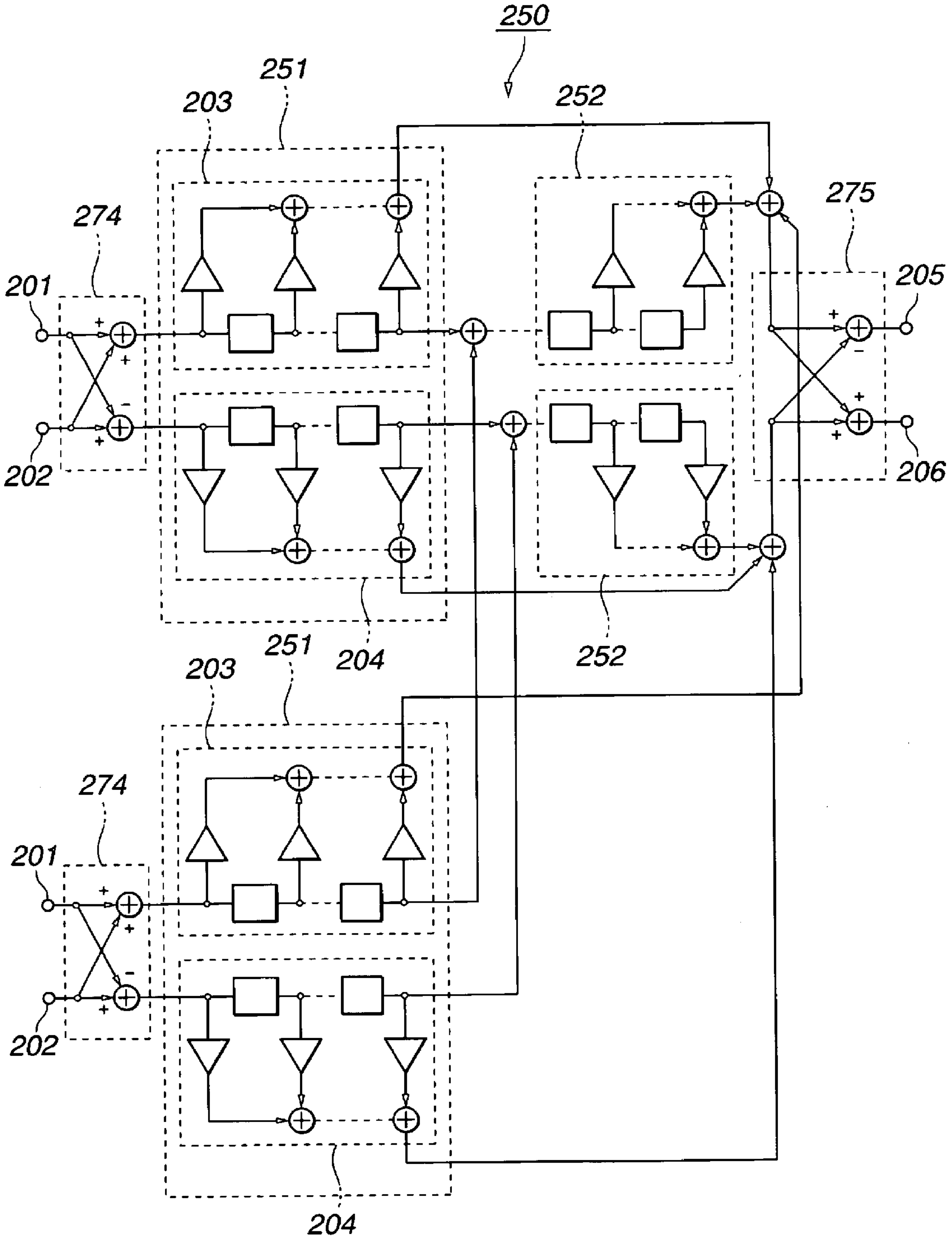
FIG. 15 is a block diagram of the virtual sound source reproducing device according to this invention in the case where virtual sound source in which sound sources are bilaterally symmetric is reproduced.

This virtual sound source reproducing unit 250 shows the example in the case where it is assumed that, as shown in FIG. 15, four sound sources are disposed substantially bilaterally symmetric with respect to listener and transfer characteristics to left and right ears of listener are substantially symmetric.

In this example, since transfer characteristics from two sound sources disposed symmetrically with respect to the front direction of listener to both ears of listener are symmetric, the relationship of the following formula (3) holds in the transfer function as has been described with reference to FIG. 2.

$$HLR=HRL$$

$$HLL=HRR \quad (3)$$

Figure 16:
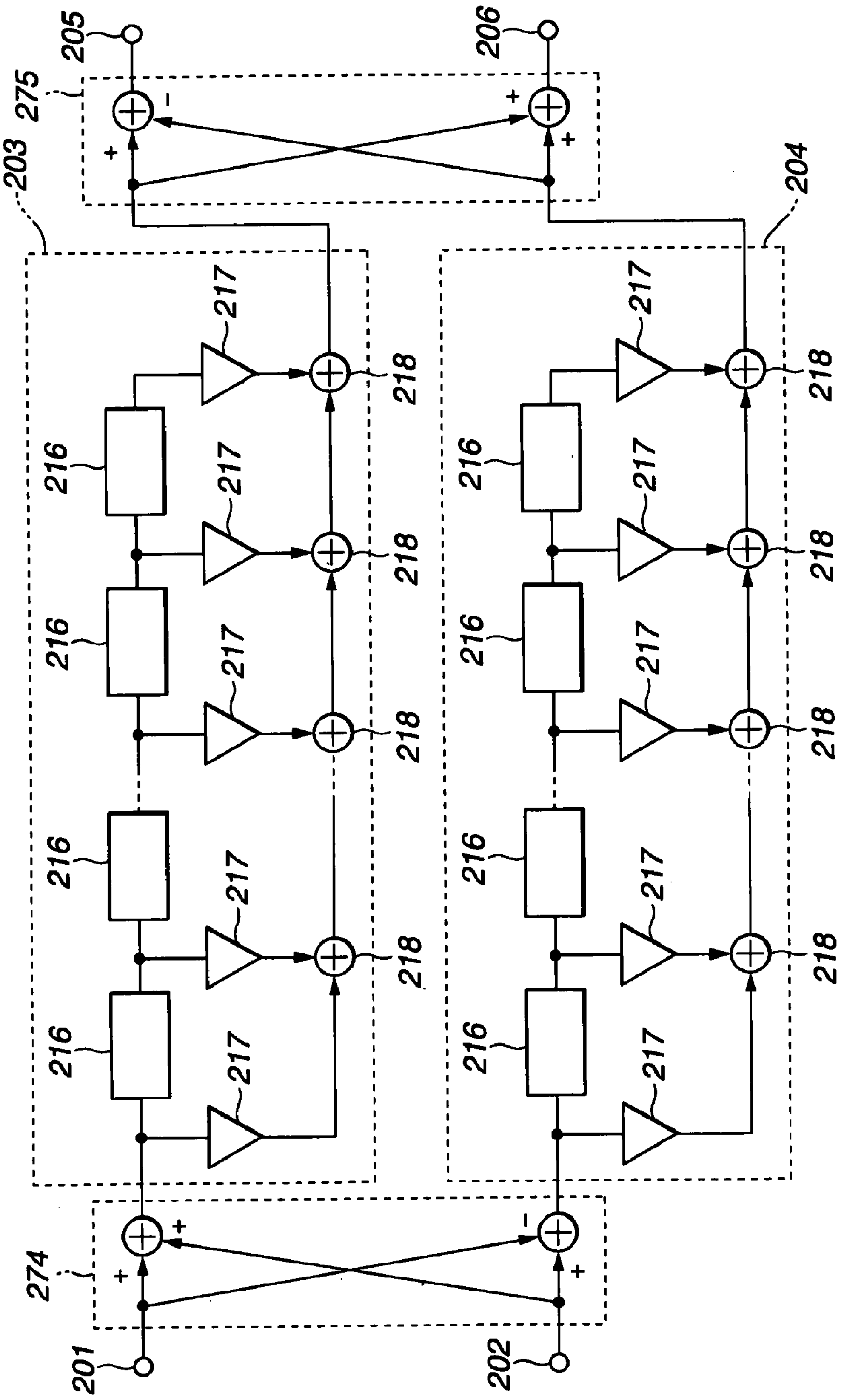
FIG. 16 is a block diagram showing virtual sound source reproducing device for realizing transfer function up to both ears in the case where sound sources are bilaterally symmetric.

The signal processing means shown in FIG. 16 constituting virtual sound source reproducing unit 250 is constituted in a manner to directly obtain transfer function with respect to two virtual sound sources symmetrically disposed by the FIR type digital filters in accordance with the above-mentioned formula (3). A pair of input signals respectively inputted from a pair of input terminals 201, 202 are inputted to an adding/subtracting processing section 274. Thus, respective sum and difference signals are formed by the adding/subtracting processing section 274. These sum and difference signals respectively are caused to undergo signal processing by first and second FIR type digital filters 203, 204. Thereafter, respective signals outputted from the first and second FIR type digital filters 203, 204 are caused to undergo adding/subtracting processing by the adding/subtracting processing section 275. Thus, respective sum and difference signals are outputted from first and second output terminals 205, 206 as a pair of output signals.

Figure 5:
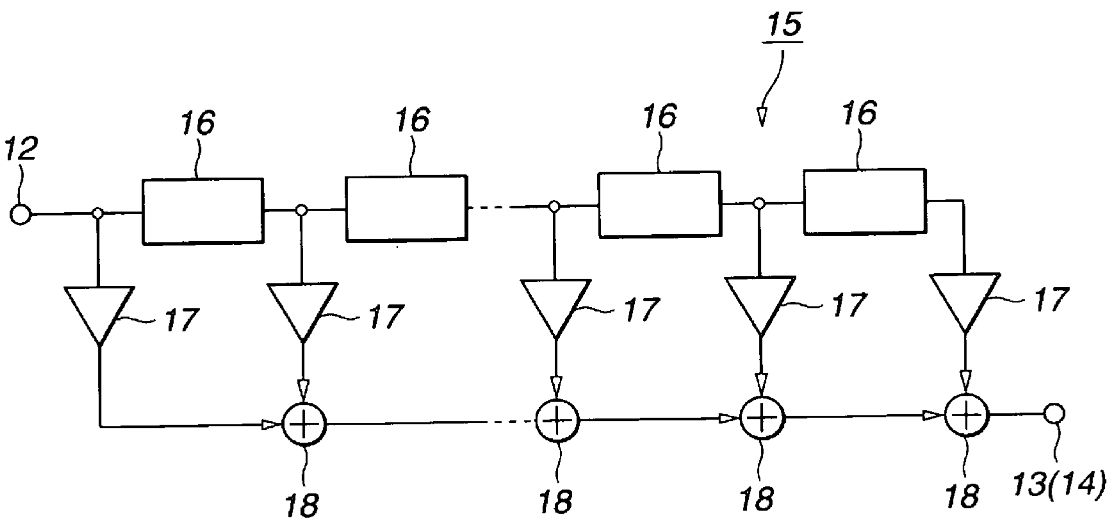
FIG. 5 is a diagram showing outline of the configuration of FIR type digital filter constituting signal processing unit of the headphone device shown in FIG. 1.
Figure 6:
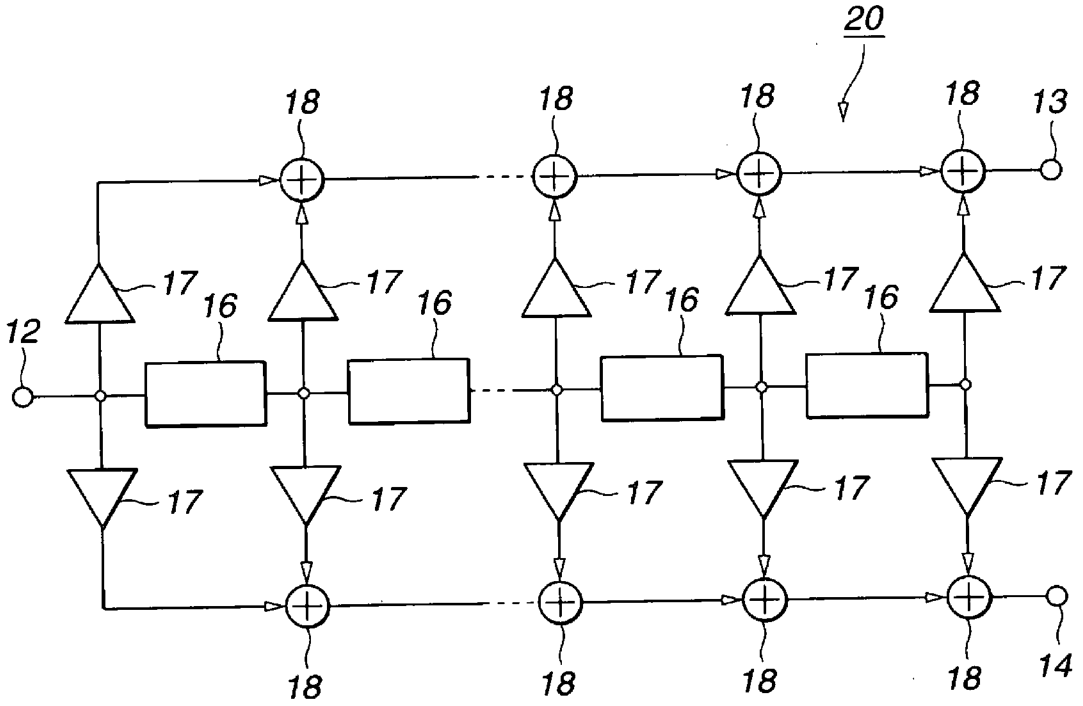
FIG. 6 is a diagram showing outline of the configuration of another FIR type digital filter constituting signal processing unit constituting the headphone device shown in FIG. 1.
Figure 7:
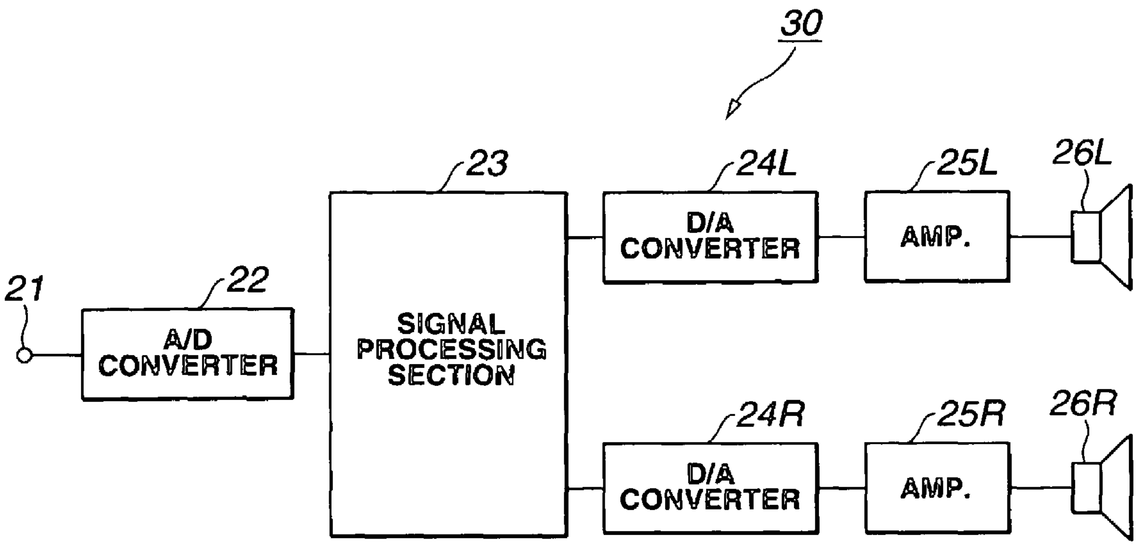
FIG. 7 is a block diagram showing speaker unit for reproducing virtual sound source.
Figure 8:
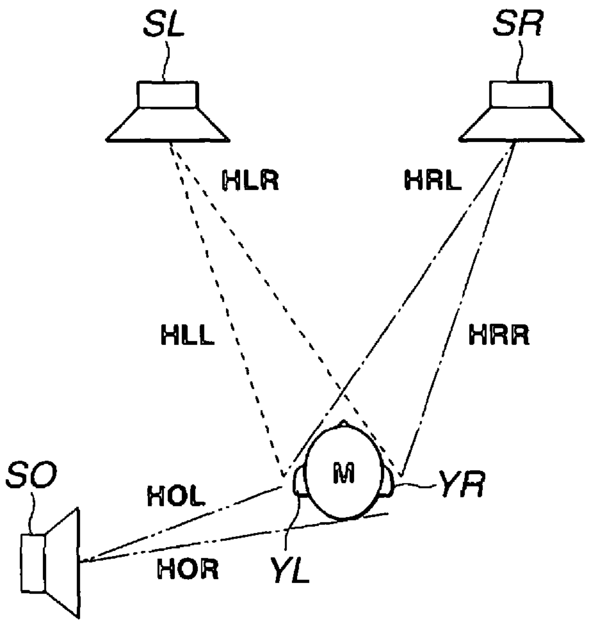
FIG. 8 is an explanatory view for explaining reproduction principle of virtual sound source by the speaker unit shown in FIG. 7.

The first and second FIR type digital filters 203, 204 used here are constituted similarly to the previously described digital filter shown in FIG. 5, and respective digital filters 203, 204 are composed, as shown in FIG. 16, of cascade-connected plural delay elements 216 having a predetermined delay quantity, plural coefficient multipliers 217 for multiplying inputted audio signal and audio signals delayed at respective delay elements 216 by coefficients for carrying out convolution of impulse response, and plural adders 218 for adding audio signals outputted from the respective coefficient multipliers 217.

The delay element 216 of the first stage of these first and second digital filters 203, 204 delays, by, e.g., one sampling period, audio signal Sal (or Sar) inputted through input terminal 201 (202), and the delay element 216 of the i (i=2, 3 . . . )-th stage similarly delays, by, e.g., one sampling period, delayed audio signal outputted from the delay element 216 of the preceding stage ((i−1)-th stage) to deliver it to delay elements 216 of the succeeding stage ((i+1)-th stage). Coefficient multipliers 217 of respective stages respectively multiply input audio signal Sal and audio signals delayed in sequence at the delay elements 216 of respective stages by coefficients for carrying out convolution of impulse response to deliver them to adders 218 of corresponding stages. The adders 218 of respective stages add, to outputs of the adders of the preceding stages, outputs of coefficient multipliers 217 of the corresponding stages to deliver them to the adders 218 of the succeeding stages. Namely, the adder 218 of the final stage carries out convolution of impulse response of transfer function HLL (HLR) with respect to audio signal Sal (Sar) inputted through the input terminal 201 (202) to form left ear audio signal Sbll (right ear audio signal Sblr) to output it to an adding/subtracting processing section 275.

In the case of four virtual sound sources substantially symmetrically disposed, it is sufficient to expand the case where the above-described two sound sources are symmetrically disposed. In the virtual sound source unit 250 shown in FIG. 15, impulse response of the signal processing means which has been explained with reference to FIG. 16 in the case where plural pairs of symmetrical sound sources exist is divided into the portion of impulse response of the head related transfer function region and impulse response portion of reflected sound region succeeding thereto, signal processing corresponding to the head related transfer function region is carried out by independently constituting transfer functions from the sound source up to both ears as first signal processing means 251, and signal processing corresponding to reflected sound region is carried out by giving a configuration such that common coefficients are convoluted by the FIR type digital filter as the second signal processing means 252.

By constituting the virtual sound source unit 250 in a manner as shown in FIG. 15, with respect to the sound source assumed to be bilaterally symmetric, also in the signal processing for reproducing virtual sound source, similarly to the first signal processing means 51 and the second signal processing means 52 which have been described with reference to FIG. 10 in the previously described first embodiment, scale of the signal processing means can be greatly reduced. While the case where the virtual sound source is reproduced when the number of sound sources is four in this example has been described, this invention may be applied to a larger number of sound sources generally bilaterally symmetrically disposed, thus making it possible to reproduce the virtual sound source.

It is to be noted that, with respect to such a signal to localize virtual sound source at the front and center, adding/subtracting processing section 274 may be provided for this signal to input both input signals in the state equally distributed, or to equally synthesize such signal with audio signal of other symmetric sound source to input it to adding/subtracting processing section 274.

A fourth embodiment of a virtual sound source reproducing unit 350 according to this invention will now be described with reference to FIG. 17.

This headphone unit 300 using the virtual sound source reproducing unit 350 is provided with virtual sound source transfer characteristic correcting means 310 corresponding to the virtual sound source reproducing unit according to this invention. Virtual sound source reproducing unit for reproducing the previously described four bilaterally symmetrically disposed virtual sound sources shown in FIG. 15 of the third embodiment is constituted as headphone unit 300. This headphone unit 300 comprises adding/subtracting processing section 374 including two adding/subtracting processing circuits 374*a*, 374*b* for carrying out adding/subtracting processing of a pair of input signals respectively inputted from a pair of input terminals 311, 312. The two adding/subtracting processing circuits 374*a*, 374*b* constituting this adding/subtracting processing section 374 carry out adding/subtracting processing of pairs of input signals respectively inputted to form respective sum and difference signals.

The virtual sound source transfer characteristic correcting means 310 constituting this headphone unit 300 comprises a rotational angle speed sensor 370 attached on a headphone 306 in order to detect rotational angle speed, i.e., displacement speed of the head portion of listener who has attached the headphone 306, a band-limiting filter 371 for band-limiting output of this rotational angle speed sensor 370, an A/D converter 372 for converting band-limited analog signal output into digital signal, and a microprocessor 373 having rotational movement angle calculation function for calculating rotational movement speed from the front direction of listener who has attached headphone 306, i.e., position change quantity of both ears from digital signal output outputted from the A/D converter 372. The rotational angle speed sensor 370 and the microprocessor 373 constitute characteristic change means comprising head portion rotational angle detecting means for detecting rotational angle speed of the head portion of listener, displacement quantity calculating means for calculating position change quantities of both ears of listener from this head portion rotational angle detecting means, and characteristic control means for changing response characteristic of the head related transfer function processing means in accordance with output of this displacement calculating means, and constitutes response characteristic control means 301. As virtual sound source transfer correcting means 310 of this invention, if there is employed such means to detect rotation of head portion or change of positions of both ears of listener, etc. to carry out a predetermined control, this means is not limited to the above-described detecting means.

When listener who has attached the headphone 306 rotates both ears in left and right directions so that the headphone 306 is rotationally moved, rotational angle speed sensor 370 attached at the headphone 306 outputs, as detection output, voltage proportional to its angular speed. This output signal is band-limited by band-limiting filter 371, and is then converted into digital signal at A/D converter 372. The digital signal thus obtained is inputted to microprocessor 373. The microprocessor 373 makes sampling, at fixed time interval, inputted output signal of the A/D converter 372 thereafter to integrate it to convert it into angular data to calculate rotational angle for rotating virtual sound source from the angular data to transfer corresponding response characteristic control data to first signal processing means 351.

The first signal processing means 351 used here updates signal processing contents of audio signals reproduced from four virtual sound sources in accordance with response characteristic control data calculated at the microprocessor 373 to carry out digital signal processing for localizing sound images of virtual sound sources at suitable positions of the outside of the head and the front portion thereof, i.e., change of parameters (coefficient data of coefficient multipliers) of FIR type digital filter corresponding to head related transfer function region. Although not shown, digital circuit capable of changing coefficients of FIR type digital filter corresponding to the head related transfer function region is prepared within the first signal processing means 351. Thereafter, output of the first signal processing means 351 is arithmetically processed together with output through signal processing corresponding to reflected sound region obtained by second signal processing means 352. Thus, a pair of computed output signals are inputted to adding/subtracting processing section 375. A pair of processing signals which have been caused to undergo adding/subtracting processing by this adding/subtracting processing section 375 are outputted as sum signal and difference signal. A pair of processing signals which have been caused to undergo adding/subtracting processing by the adding/subtracting processing section 375 are respectively outputted to two D/A converters 304L, 304R. Both ear synthetic audio signals Sbl, Sbr returned (converted) into analog signal for a second time by the two D/A converters 304L, 304R are respectively delivered to left and right headphone elements 306*a*, 306*b* of the headphone 306 through amplifiers 305L, 305R and are reproduced, thus providing optimum out-of-head localization feeling in correspondence with position change of both ears to listener who listens to it.

Respective FIR type digital filters constituting the first signal processing means 351 constitute head related transfer functions of transfer functions of HLL, HLR, HRL, HRR ranging from speakers to both ears of the listener which have been described with reference to FIG. 2, and these head related transfer functions are not fixed in practice, but change with movement of the head of listener. Change in synchronism with movement of the head of this head related transfer function constitutes cause for allowing listener to recognize position of sound image. Accordingly, it is known that precisely reproducing such operation contributes improvement in the quality of sound image localization.

In the headphone unit 300 of this embodiment, in order to realize, in accordance with detected rotational angle of the head of listener, head related transfer function corresponding to that angle, the head related transfer function is realized as described above by updating, on the real time basis, coefficients of respective FIR type digital filters by the microprocessor 373. As stated above, coefficients of the FIR type digital filter corresponding to the head related transfer function region contributing to perception (sensing) of position are updated on the real time basis, and coefficients of FIR type digital filter corresponding to reflected sound region contributing to perception (sensing) of distance remain to be fixed. Accordingly, as compared to the case where all coefficients of FIR type digital filter constituting the transfer function, coefficient memory capacity necessary for coefficient updating can be reduced to much degree.

A fifth embodiment of a virtual sound source reproducing unit 450 according to this invention will now be described with reference to FIG. 18.

Figure 17:
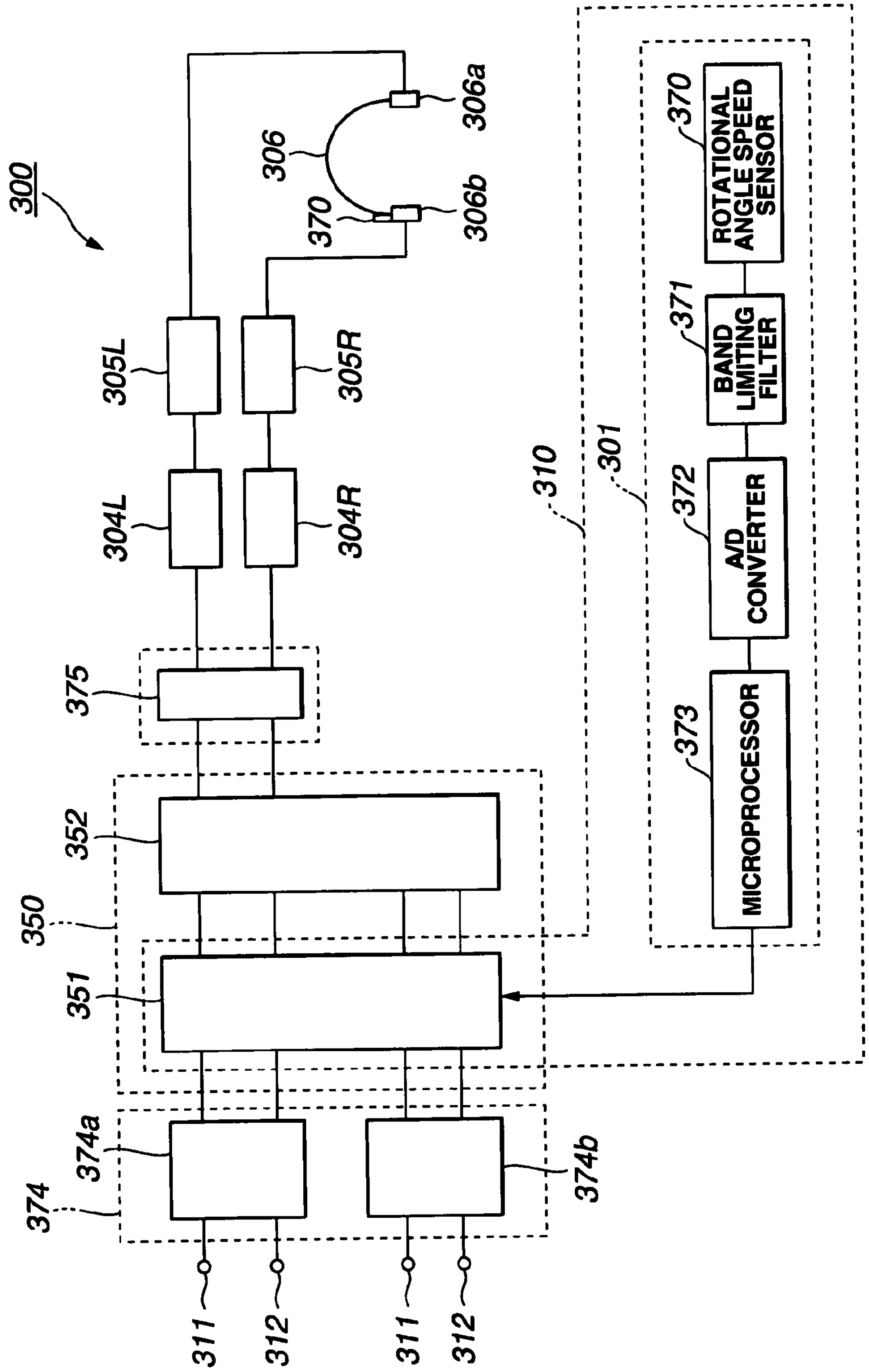
FIG. 17 is a block diagram showing virtual sound source transfer characteristic correcting means constituting the virtual sound source reproducing device according to this invention.

This virtual sound source unit 450 serves to control response characteristic corresponding to the head related transfer function region by the virtual sound source transfer characteristic correcting means 310 shown in FIG. 17, and is related to first signal processing means 451 of the virtual sound source reproducing unit 450 according to this invention in connection with two virtual sound sources.

Figure 18:
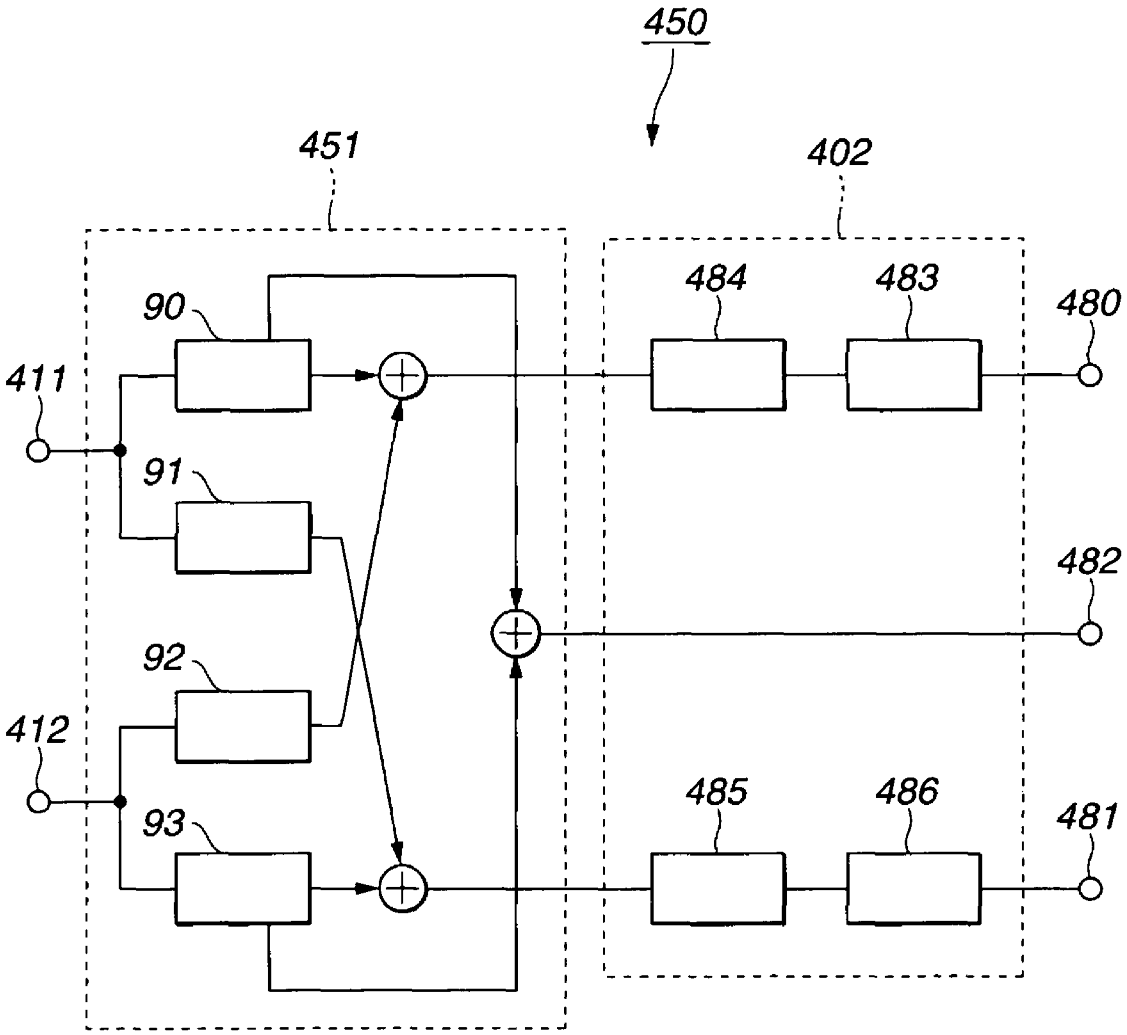
FIG. 18 is a block diagram showing another embodiment of virtual sound source transfer characteristic correcting means constituting the virtual sound source reproducing device according to this invention.

It is to be noted that reference numeral 402 in FIG. 18 indicates only the portion for changing parameters related to virtual sound source position to be reproduced of the first signal processing means 451 of the virtual sound source transfer characteristic correcting means 310, and the description of the response characteristic control means 301 will be omitted since the operation is similar to that which has been described in the fourth embodiment.

As first to fourth FIR type digital filters 90 to 93 constituting first signal processing means 451 shown in FIG. 18, there are used, e.g., digital filters similar to the digital filters which have been explained with reference to FIG. 12 in the first embodiment. In this case, the respective FIR type digital filters 90 to 93 realize impulse response portions corresponding to the previously described head related transfer function regions of HLL, HLR, HRL, HRR up to both ears in the case where listener is directed in fixed direction, e.g., at front side from speaker which has been described with reference to FIG. 2.

In this example, the first and second FIR type digital filters 90, 91 are supplied with audio signal through first input terminal 411 from one sound source, and the third and fourth FIR type digital filters 92, 93 are supplied with audio signal through second input terminal 412 from the other one sound source.

Outputs of the first FIR type digital filter 90 and the third FIR type digital filter 92 are added, and outputs of the second FIR type digital filter 91 and the fourth FIR type digital filter 93 are added, and these outputs thus added are respectively outputted to time difference adding sections 484, 485. Further, respective outputs are delivered to level difference adding sections 483, 486. Their outputs are outputted as output signals of left and right two systems through first and second output terminals 480, 481 similarly to the case where explanation has been given with reference to FIG. 10 in the first embodiment and are inputted to the second signal processing means. Thus, these output signals are added. In addition, output signal from the first signal processing means 451 is inputted to the second signal processing means 402 through third output terminal 482. Processing similar to that at the previously described first embodiment is carried out.

Here, in the time difference adding sections 484, 485 and level difference adding sections 483, 486, in the case where, e.g., listener rotates his head portion in a right direction, audio signal reached to the left ear becomes faster than audio signal reached to the right ear, and the left ear becomes close to the sound source and the right ear becomes away from the sound source. For this reason, level of audio signal which is reached to the left ear becomes higher than that of audio signal which is reached to the right ear. By paying attention to this fact, change of transfer function resulting from the fact that head of listener is moved is represented by time difference and level difference of audio signal reached to the both ears to control these differences reached to the both ears by microprocessor, thereby making it possible to simulate and simplify dynamic transfer function.

Figure 19:
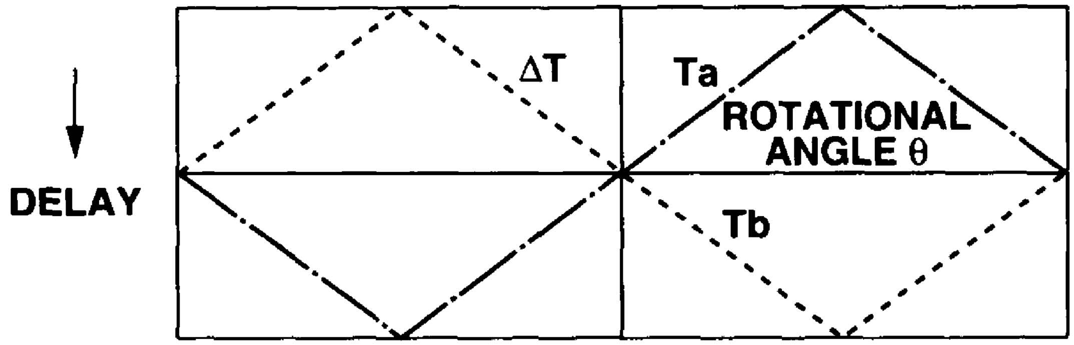
FIG. 19 is an explanatory view for explaining operation of time difference adding unit used in virtual sound source transfer characteristic correcting means shown in FIG. 18.

FIG. 19 shows delay time characteristic of the time difference adding sections 484, 485, wherein delay time added at the time difference adding section 484 for the left side is represented by characteristic curve Ta of single dotted lines and delay time added at the time difference adding section 485 for right side is represented by characteristic curve Tb of broken lines. The characteristic curves Ta and Tb are curves having increase/decrease directions entirely opposite to each other with respect to rotational direction of head portion of listener M.

Figure 1:
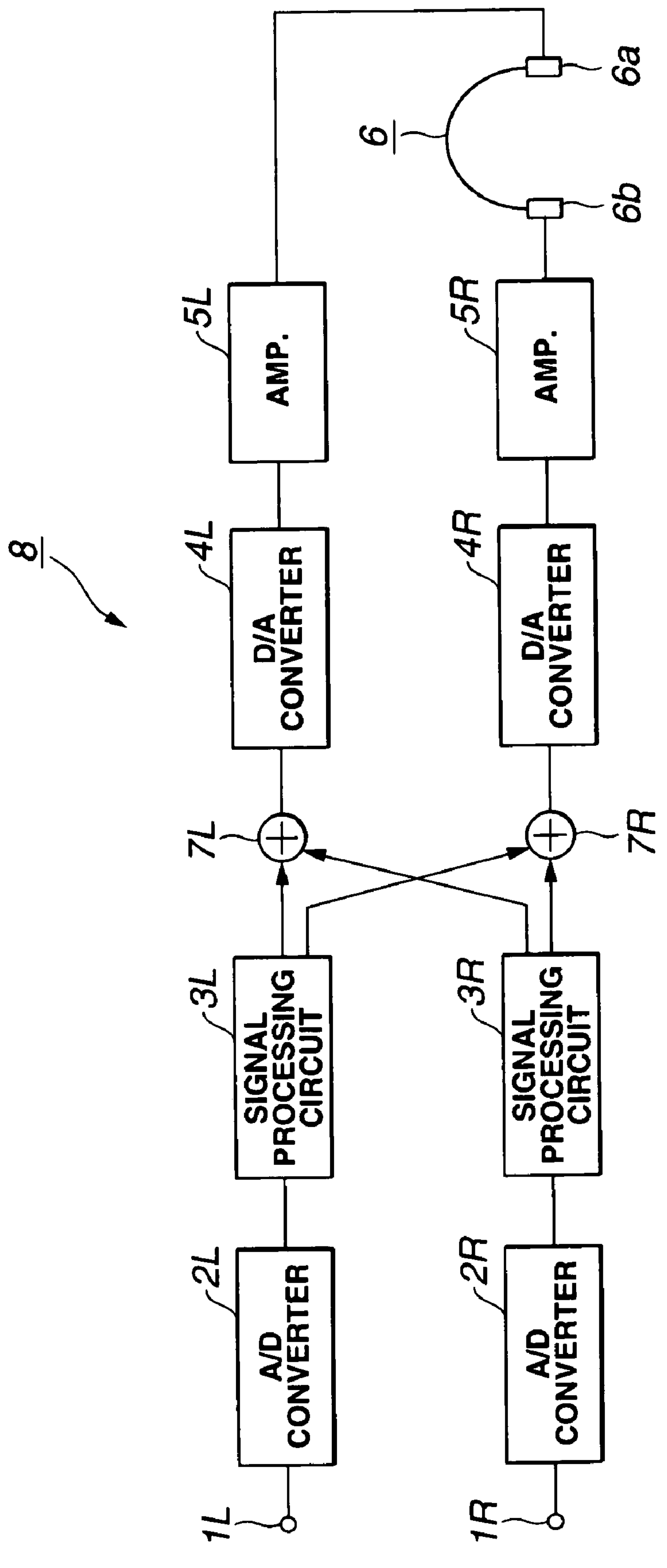
FIG. 1 is a block diagram showing outline of the configuration of stereo out-of-head sound image localization type headphone device.
Figure 2:
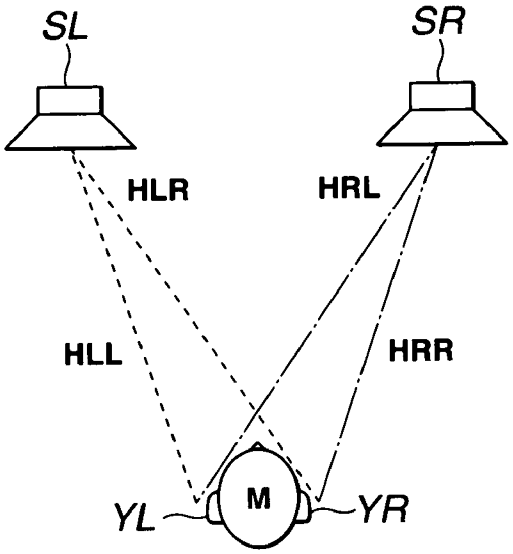
FIG. 2 is an explanatory view for explaining transfer function of audio signal from sound source up to both ears.
Figure 3:
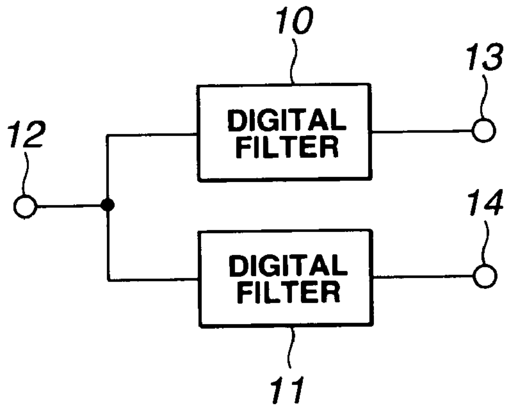
FIG. 3 is a block diagram showing signal processing unit constituting the headphone device shown in FIG. 1.
Figure 4:
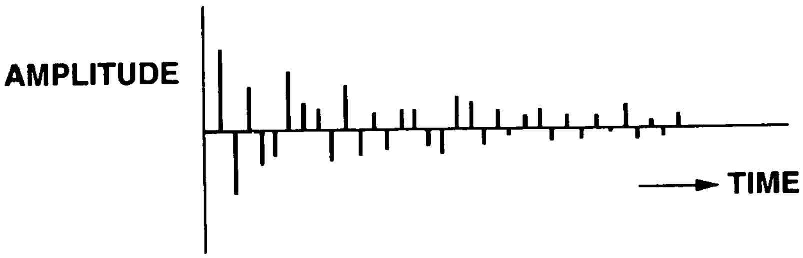
FIG. 4 is an explanatory view for explaining impulse response of transfer function of audio signal from sound source up to both ears.

As stated above, by providing time difference with respect to arrival of audio signals to both ears by using the time difference adding sections 484, 485, it is possible to realize change of time difference from sound source to both ears by using sound device such as headphone, etc. which is similar to the case where listener M listens to sound from sound source disposed within the range of forward 180 degrees while rotating his head in left and right directions as has been explained with reference to the previously mentioned FIG. 2.

Figure 20:
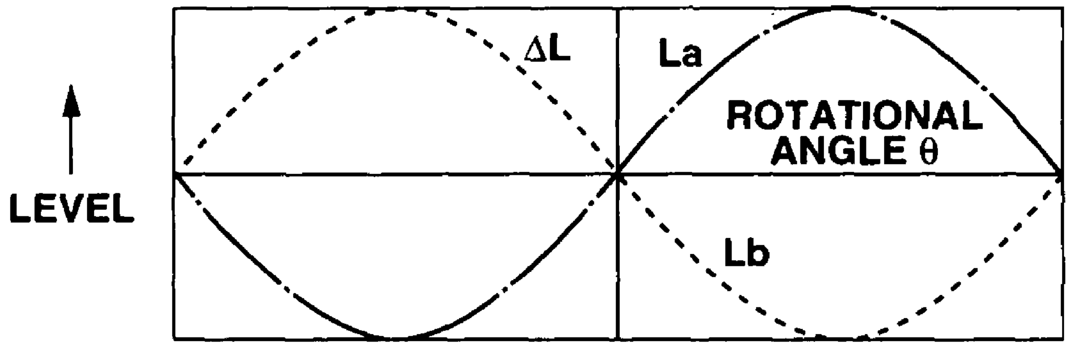
FIG. 20 is an explanatory view for explaining operation of level difference adding unit used in the virtual sound source transfer characteristic correcting means shown in FIG. 18.

Moreover, FIG. 20 shows relative level characteristic of level difference adding sections 483, 486. Level difference added at level difference adding section 483 for left side is indicated by characteristic curve La of single dotted lines and level difference added at level difference adding section 486 for right side is indicated by characteristic curve Lb of broken lines. In FIG. 20, there are indicated relative levels from the state where rotational position of the head is 0 degrees (forward front).

In FIG. 20, the characteristic curves La, Lb are curves having increase/decrease directions entirely opposite to each other with respect to rotational direction of the head portion of listener M. By providing level difference with respect to audio signal at both ears by using level difference adding sections 483, 486, it is possible to realize, by using sound apparatus such as headphone, etc., change of level difference at both ears similarly to the case where listener M listens to sound from sound source placed within the range of forward 180 degrees while rotating the head in left and right directions shown in FIG. 2.

While the virtual sound source reproducing device of this invention has been described above, the virtual sound source reproducing device of this invention may be provided at sound apparatus such as headphone unit or speaker unit, etc., and may be provided at sound equipments for handling sound such as audio equipment, etc. Also in both cases, it is clear that the virtual sound source can be suitably formed and the scale of the configuration of the sound apparatus and sound equipment can also become compact.

INDUSTRIAL APPLICABILITY

In the virtual sound source reproducing device and the sound apparatus and the sound equipment provided with such a device according to this invention, the virtual sound source reproducing device is composed of first signal processing means and second signal processing means, wherein the first signal processing means is used to mainly represent the portion of head related transfer function to have ability to reproduce the portion of impulse response capable of perceiving (sensing) position of virtual sound source to localize sound image at the outside of head portion in a desired direction, and the second signal processing means is used to reproduce the portion of impulse response to perceive (sense) only distance of the virtual sound source to add reflected sound, etc. to thereby carry out signal processing to provide feeling of distance with respect to sound source, thus making it possible to localize, at the outside of the head, sound image having high reality as if sound source disposed within space actually exists, and to reduce to much degree operation quantity required for signal processing as compared to the case where transfer function from virtual sound source up to both ears is directly constituted by signal processing means. Accordingly, virtual sound source reproducing device of which configuration scale is compact can be advantageously realized.

Moreover, there is employed virtual sound source transfer function correcting means to detect displacement speeds of both ears by using rotational angular sensor or microprocessor to calculate change of positions of both ears for the purpose of coping with change of transfer function from virtual sound source to both ears resulting from the fact that listener moves his head in left and right directions to directly control coefficients of digital filter corresponding to the head related transfer function region of first signal processing means of the above-described virtual sound source reproducing device, or to indirectly control impulse response portion corresponding to the above-described head related transfer function region by using the time difference adding section and the level difference adding section added to the succeeding stage of the first signal processing means. Thus, even when listener moves his head in left and right directions, he can feel sound image having high reality as if he moves his head with respect to sound source disposed within space.

In addition, when the virtual sound source reproducing device according to this invention is provided at sound apparatus such as headphone unit or speaker unit, etc., or sound equipment such as audio unit, etc., miniaturization of the sound apparatus and the sound equipment and low power consumption can be realized.

The invention claimed is:

1. A virtual sound source reproducing device for carrying out signal processing of an input audio signal in accordance with impulse responses from a virtual sound source to both ears of a listener to localize a reproduced sound image at a position of the virtual sound source, the device comprising:

head related transfer function processing means for carrying out signal processing of the input audio signal in accordance with a first initial portion along a time axis of the impulse responses contributing to perception by the listener of a position of the virtual sound source to obtain a pair of initial response signals, and for delaying the input audio signal by a time equivalent to a time length of the first initial portion of the impulse response to obtain a delayed output signal, the time length is in a range between 10 and 30 milliseconds;

reflected sound processing means for processing the delayed output signal outputted by said head related transfer function processing means in accordance with a second predetermined portion along the time axis immediately after the first initial portion of the impulse response contributing to perception of only a distance to the virtual sound source to obtain a pair of reflected response signals;

synthesizing means for respectively synthesizing the pair of initial response signals and the pair of reflected response signals to obtain a pair of synthesized audio signals;

the head related transfer function processing means is comprised of an FIR type digital filter, and the FIR type digital filter is constituted, with cascade-connected delay elements being common elements, by a first FIR type digital filter for carrying out signal processing of the input audio signal in accordance with the first initial portion along the time axis of the impulse response from the virtual sound source to a left ear of the listener, said first initial portion contributing to the perception of a position of the virtual sound source, and a second FIR type digital filter for carrying out signal processing of the input audio signal in accordance with the first initial portion along the time axis of the impulse response from the virtual sound source to a right ear of the listener, and is supplied with the input audio signal to obtain the pair of initial response signals and the delayed output signal; and further comprising characteristic change means for detecting changes in position, respectively, of the left and right ears of the listener from initial states, respectively, of the left and right ears of the listener and for changing response characteristic of the head related transfer function processing means in response thereto such that the position of the virtual sound source is changed separately for the left and right ears of the listener in correspondence with the changes in position of the left and right ears of the listener from the respective initial states, in which at least a portion of the characteristic change means is worn by the listener during operation, wherein the characteristic change means comprises head portion rotational angle detecting means for detecting rotational angle speeds of both ears of the listener, displacement quantity calculating means for calculating position change quantities of the left and right ears of the listener from the respective initial states from an output of the head portion rotational angle detecting means indicating the rotational angle speeds, and characteristic control means for changing response characteristic of the head related transfer function processing means separately for the left and right ears of the listener in accordance with outputs of the displacement quantity calculating means respectively for the left and right ears of the listener.

2. The virtual sound source reproducing device as set forth in claim 1, wherein the reflected sound processing means is constituted by an FIR type digital filter, and the FIR type digital filter is constituted, with cascade-connected delay elements being common elements, a first FIR type digital filter for carrying out signal processing of the delayed output signal outputted from said head related transfer function processing means in accordance with the second predetermined portion along the time axis after the first initial portion of the impulse response contributing to perception of only distance of the virtual sound source of impulse response from the virtual sound source to the left ear of the listener and a second FIR type digital filter for carrying out signal processing of the delay output signal in accordance with the second portion of the impulse response contributing to perception or sensing of only distance of the virtual sound source of impulse response from the virtual sound source to the right ear of the listener, and is supplied with the delayed output signal to obtain the pair of reflected response signals.

3. The virtual sound source reproducing device as set forth in claim 1, wherein the reflected sound processing means is comprised of an FIR type digital filter, and the FIR type digital filter is of the configuration in which there are assigned coefficients determined from the second predetermined portion along the time axis after the first initial portion of the impulse response contributing to perception of only distance of the virtual sound source of at least either one of impulse responses from the virtual sound source to the left ear and the right ear of the listener, thus to output, as the pair of reflected response signals, an output signal obtained as the result of the delayed output signal outputted from the head related transfer function processing means being delivered to the reflected sound processing means.

4. The virtual sound source reproducing device as set forth in claim 1, wherein the characteristic control means directly controls parameters of the head related transfer function processing means to change the response characteristic.

5. The virtual sound source reproducing device as set forth in claim 1, wherein the input audio signal comprises a plurality of audio signals, the device further comprising a plurality of the head related transfer function processing means respectively supplied with the plurality of audio signals, and synthesizing means for respectively synthesizing the pair of initial response signals and the delayed output signal outputted from the plurality of head related transfer function processing means to obtain a pair of synthesized initial response signals and a synthesized delayed output signal fed to the reflected sound processing means, and to respectively synthesize the pair of reflected response signals from the reflected sound processing means and the pair of synthetic initial response signals.

6. A virtual sound source reproducing device for carrying out signal processing of a pair of input audio signals in accordance with impulse responses from a virtual sound source to both ears of a listener from a pair of acoustic transducers bilaterally symmetrically disposed with respect to the listener to localize a reproduction sound image at a portion of the virtual sound source, the device comprising:

a first adding/subtracting processing section for generating a first sum signal and a first difference signal from the pair of input audio signals;

first filter means for carrying out signal processing of the first sum signal from the first adding/subtracting processing section;

second filter means for carrying out signal processing of the first difference signal from the first adding/subtracting processing section; and a second adding/subtracting processing section for generating a second sum signal and a second difference signal delivered to the pair of acoustic transducers from a pair of output signals from the first and second filter means, the first and second filter means respectively include head related transfer function processing means having cascade-connected delay elements as common elements for carrying out signal processing of an input signal in accordance with a first initial portion along a time axis of the impulse response contributing to a perception of a position of the virtual sound source of impulse responses of respective filter means to obtain an initial response signal, and to delay the input signal by a time equivalent to a time length of the first initial portion along the time axis of the impulse response to obtain a delayed output signal, the time length is in a range between 10 and 30 milliseconds, reflected sound processing means for carrying out signal processing of the delayed output signal outputted from the head related transfer function processing means in accordance with a second predetermined portion along the time axis after the first initial portion of the impulse response contributing to a perception of only a distance of the virtual sound source from the listener to obtain a reflected response signal, and synthesizing means for synthesizing the initial response signal and the reflected response signal; and further comprising characteristic change means for detecting changes in position, respectively, of the left and right ears of the listener from initial states, respectively, of the left and right ears of the listener and for changing response characteristic of the head related transfer function processing means in response thereto such that the position of the virtual sound source is changed separately for the left and right ears of the listener in correspondence with the changes in position of the left and right ears of the listener from the respective initial states, in which at least a portion of the characteristic change means is worn by the listener during operation, wherein the characteristic change means comprises head portion rotational angle detecting means for detecting rotational angle speeds of both ears of the listener, displacement quantity calculating means for calculating position change quantities of the left and right ears of the listener from an output of the head portion rotational angle detecting means indicating the rotational angle speeds, and characteristic control means for changing response characteristic of the head related transfer function processing means separately for the left and right ears of the listener in accordance with outputs of the displacement calculating means respectively for the left and right ears of the listener.

7. The virtual sound source reproducing device as set forth in claim 6, wherein the characteristic control means directly controls parameters of the head related transfer function processing means to change the response characteristic.

8. The virtual sound source reproducing device as set forth in claim 6, further comprising a plurality of the first adding/subtracting processing sections respectively supplied with a plurality of the pair of input audio signals, a plurality of the head related transfer function processing means respectively supplied with audio signals from the plurality of the first adding/subtracting processing sections, and a pair of the reflected sound processing means to respectively synthesize a plurality of the initial response signals and the delayed output signals outputted from the plurality of head related transfer function processing means to obtain a synthesized initial response signal and a synthesized delayed output signal and to deliver the synthesized delay output signal to the reflected sound processing means, and to respectively synthesize the reflected response signals from the reflected sound processing means and the pair of synthesized initial response signals.

9. The virtual sound source reproducing device as set forth in claim 8, further comprising a time difference adding section and a level difference adding section supplied with the pair of synthetic initial response signals outputted from the plurality of head portion transfer processing means to add a time difference and level difference between the pair of synthesized initial response signals.

10. The virtual sound source reproducing device as set forth in claim 9, wherein the characteristic control means is for changing time difference and the level difference of the time difference adding section and the level difference adding section in accordance with an output of the displacement quantity calculating means.

11. The virtual sound source reproducing device as set forth in claim 9, wherein the time difference adding section and the level difference adding section change the time difference and the level difference between the pair of initial response signals in a complementary relationship.

12. The virtual sound source reproducing device as set forth in claim 6, further comprising a time difference adding portion and a level difference adding section supplied with, a pair of initial response signals outputted from the head related transfer function processing means, and for respectively adding a time difference and a level difference between the pair of initial response signals.

13. The virtual sound source reproducing device as set forth in claim 12, wherein the time difference adding section and the level difference adding section change the time difference and the level difference between the pair of initial response signals in a complementary relationship.

14. A sound apparatus having virtual sound source reproducing means for carrying out signal processing of an input audio signal in accordance with impulse responses from a virtual sound source to both ears of a listener to localize a reproduced sound image at a position of the virtual sound source, the virtual sound source reproducing means comprises:

head related transfer function processing means having cascade-connected delay elements as common elements for carrying out signal processing of the input audio signal in accordance with a first initial portion along a time axis of the impulse responses contributing to perception of the position of the virtual sound source to obtain a pair of initial response signals, and for delaying the input audio signal by a time equivalent to a time length of the first initial portion of the impulse response to obtain a delayed signal, the time length is in a range between 10 and 30 milliseconds;

reflected sound processing means for processing the delayed signal outputted by said head related transfer function processing means in accordance with a second predetermined portion along the time axis immediately after the first initial portion of the impulse response contributing to perception of only distance to the virtual sound source to obtain a pair of reflected response signals;

synthesizing means for respectively synthesizing the pair of initial response signals and the pair of reflected response signals to obtain a pair of synthesized audio signals; and characteristic change means for detecting changes in position of the left and right ears of the listener from initial states, respectively, of the left and right ears of the listener and for changing response characteristic of the head related transfer function processing means in response thereto such that the position of the virtual sound source is changed separately for the left and right ears of the listener in correspondence with the changes in position of the left and right ears of the listener from the respective initial states, in which at least a portion of the characteristic change means is worn by the listener during operation, wherein the characteristic change means comprises head portion rotational angle detecting means for detecting rotational angle speeds of both ears of the listener, displacement quantity calculating means for calculating position change quantities of the left an right ears of the listener from the respective initial states from an output of the head portion rotational angle detecting means indicating the rotational angle speeds, and characteristic control means for changing response characteristic of the head related transfer function processing means separately for the left and right ears of the listener in accordance with outputs of the displacement quantity calculating means respectively for the left and right ears of the listener.

15. A sound equipment having virtual sound source reproducing means for carrying out signal processing of an input audio signal in accordance with impulse responses from a virtual sound source to both ears of listener to localize a reproduced sound image at a position of the virtual sound source, the virtual sound source reproducing means comprises:

head related transfer function processing means having cascade-connected delay elements as common elements for carrying out signal processing of the input audio signal in accordance with a first initial portion along a time axis of the impulse responses contributing to perception of the position of the virtual sound source to obtain a pair of initial response signals, and for delaying the input audio signal by a time equivalent to a time length of the first initial portion of the impulse response to obtain a delayed signal, the time length is in a range between 10 and 30 milliseconds;

reflected sound processing means for processing the delayed signal outputted by said head related transfer function processing means in accordance with a second predetermined portion along the time axis immediately after the first initial portion of the impulse response contributing to perception of only distance to the virtual sound source to obtain a pair of reflected response signals;

synthesizing means for respectively synthesizing the pair of initial response signals and the pair of reflected response signals to obtain a pair of synthesized audio signals; and characteristic change means for detecting changes in position of the left and right ears of the listener from initial states, respectively, of the left and right ears of the listener and for changing response characteristic of the head related transfer function processing means in response thereto such that the position of the virtual sound source is changed separately for the left and right ears of the listener in correspondence with the changes in position of the left and right ears of the listener from the respective initial states, in which at least a portion of the characteristic change means is worn by the listener during operation, wherein the characteristic change means comprises head portion rotational angle detecting means for detecting rotational angle speeds of both ears of the listener, displacement quantity calculating means for calculating position change quantities of the left and right ears of the listener from the respective initial states from an output of the head portion rotational angle detecting means indicating the rotational angle speeds, and characteristic control means for changing response characteristic of the head related transfer function processing means separately for the left and right ears in accordance with outputs of the displacement quantity calculating means respectively for the left and right ears of the listener.

16. A sound apparatus having virtual sound source reproducing means for carrying out signal processing of a pair of input audio signals in accordance with impulse responses from a virtual sound source to both ears of a listener from a pair of acoustic transducers disposed bilaterally symmetrically with respect to the listener to localize a reproduced sound image at a position of the virtual sound source, the virtual sound source reproducing means comprises:

a first adding/subtracting processing section for generating a first sum signal and a first difference signal from the pair of input audio signals;

first filter means for carrying out signal processing of the first sum signal from the first adding/subtracting processing section;

second filter means for carrying out signal processing of the first difference signal from the first adding/subtracting processing section;

a second adding/subtracting processing section for generating a second sum signal and a second difference signal delivered to the pair of acoustic transducers from a pair of output signals from the first and second filter means, and wherein the first and second filter means respectively include head related transfer function processing means having cascade-connected delay elements as common elements for carrying out signal processing of an input signal in accordance with a first initial portion along a time axis of the impulse response contributing to a perception of a position of the virtual sound source of impulse responses of respective filter means to obtain an initial response signal, and to delay the input signal by a time equivalent to a time length of the first initial portion along the time axis of the impulse response to obtain a delayed output signal, the time length is in a range between 10 and 30 milliseconds, reflected sound processing means for carrying out signal processing of the delayed output signal outputted from the head related transfer function processing means in accordance with a second predetermined portion along the time axis after the first initial portion of the impulse response contributing to a perception of only a distance of the virtual sound source from the listener to obtain the reflected response signal, and synthesizing means for synthesizing the initial response signal and the reflected response signal; and further comprising characteristic change means for detecting changes in position, respectively, of the left and right ears of the listener from initial states, respectively, of the left and right ears of the listener and for changing response characteristic of the head related transfer function processing means in response thereto such that the position of the virtual sound source is changed separately for the left and right ears of the listener in correspondence with the changes in position of the left and right ears of the listener from the respective initial states, in which at least a portion of the characteristic change means is worn by the listener during operation, wherein the characteristic change means comprises head portion rotational angle detecting means for detecting rotational angle speeds of both ears of the listener, displacement quantity calculating means for calculating position change quantities of the left and right ears of the listener from the respective initial states from an output of the head portion rotational angle detecting means indicating the rotational angle speeds, and characteristic control means for changing response characteristic of the head related transfer function processing means separately for the left and right ears of the listener in accordance with outputs of the displacement quantity calculating means respectively for the left and right ears of the listener.

17. A sound equipment having virtual sound source reproducing means for carrying out signal processing of a pair of input audio signals in accordance with impulse responses from a virtual sound source to both ears of a listener from a pair of acoustic transducers disposed bilaterally symmetrically with respect to the listener to localize a reproduced sound image at a position of the virtual sound source, the virtual sound source reproducing means comprises:

a first adding/subtracting processing section for generating a first sum signal and a first difference signal from the pair of input audio signals;

first filter means for carrying out signal processing of the first sum signal from the first adding/subtracting processing section;

second filter means for carrying out signal processing of the first difference signal from the first adding/subtracting processing section; and a second adding/subtracting processing section for generating a second sum signal and a second difference signal delivered to the pair of acoustic transducers from a pair of output signals from the first and second filter means, and wherein the first and second filter means are respectively provided with head related transfer function processing means having cascade-connected delay elements as common elements for carrying out signal processing of an input signal in accordance with a first initial portion along a time axis of the impulse response contributing to a perception of the position of the virtual sound source to obtain an initial response signal, and for delaying the input signal by a time equivalent to a time length of the first initial portion along the time axis of the impulse response to obtain a delayed output signal, the time length is in a range between 10 and 30 milliseconds, reflected sound processing means for carrying out signal processing of the delayed output signal outputted by said head related transfer function processing means in accordance with a second predetermined portion along the time axis after the first initial portion of the impulse response contributing to a perception of only a distance from the listener of the virtual sound source to obtain a reflected response signal, and synthesizing means for synthesizing the initial response signal and the reflected response signal; and further comprising characteristic change means for detecting changes in position, respectively, of the left and right ears of the listener from initial states, respectively, of the left and right ears of the listener and for changing response characteristic of the head related transfer function processing means in response thereto such that the position of the virtual sound source is changed in correspondence with the changes in position of the left and right ears of the listener from the respective initial states, in which at least a portion of the characteristic change means is worn by the listener during operation, wherein the characteristic change means comprises head portion rotational angle detecting means for detecting rotational angle speeds of both ears of the listener, displacement quantity calculating means for calculating position change quantities of the left and right ears of the listener from the respective initial states from an output of the head portion rotational angle detecting means indicating the rotational angle speeds, and characteristic control means for changing response characteristic of the head related transfer function processing means separately for the left and right ears of the listener in accordance with outputs of the displacement quantity calculating means respectively for the left and right ears of the listener.

* * * * *

UNITED STATES PATENT AND TRADEMARK OFFICE

CERTIFICATE OF CORRECTION

PATENT NO. : 7,917,236 B1
APPLICATION NO. : 09/647444
DATED : March 29, 2011
INVENTOR(S) : Yuji Yamada It is certified that error appears in the above-identified patent and that said Letters Patent is hereby corrected as shown below:

On the face of the patent, and in column 1, the title should read --VIRTUAL SOUND SOURCE DEVICE AND SOUND APPARATUS USING SUCH DEVICE--

Signed and Sealed this
Tenth Day of May, 2011

David J. Kappos
*Director of the United States Patent and Trademark Office*